(12) United States Patent
Momose et al.

(10) Patent No.: US 10,712,186 B2
(45) Date of Patent: *Jul. 14, 2020

(54) MEASURING PIPE PRESS FITTED IN A PIPE HOLE OF A CIRCUIT BOARD WITH A GUIDE PROVIDED ON AN INNER WALL OF A CASE BODY

(71) Applicant: AZBIL CORPORATION, Chiyoda-ku (JP)

(72) Inventors: Osamu Momose, Chiyoda-ku (JP); Hiroyuki Inagaki, Chiyoda-ku (JP)

(73) Assignee: AZBIL CORPORATION, Chiyoda-ku (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/299,751

(22) Filed: Mar. 12, 2019

(65) Prior Publication Data

US 2019/0285443 A1 Sep. 19, 2019

(30) Foreign Application Priority Data

Mar. 13, 2018 (JP) .................. 2018-045404

(51) Int. Cl.
*G01F 1/58* (2006.01)
*G01F 1/00* (2006.01)
*G01F 15/14* (2006.01)

(52) U.S. Cl.
CPC .............. *G01F 1/588* (2013.01); *G01F 1/002* (2013.01); *G01F 1/584* (2013.01); *G01F 1/586* (2013.01); *G01F 15/14* (2013.01)

(58) Field of Classification Search
None
See application file for complete search history.

(56) References Cited

U.S. PATENT DOCUMENTS

2001/0027039 A1* 10/2001 Okabe .................. H01R 13/743
439/79
2019/0285444 A1* 9/2019 Inagaki .................... G01F 15/14

FOREIGN PATENT DOCUMENTS

JP H07-120282 5/1995
JP 2004-226394 8/2004
JP 2014-202662 10/2014

* cited by examiner

*Primary Examiner* — Harshad R Patel
(74) *Attorney, Agent, or Firm* — Oblon, McClelland, Maier & Neustadt, L.L.P.

(57) ABSTRACT

A pipe hole to which a measuring pipe is to be press-fitted is formed in a printed board, and a guide to be fitted to a side end portion of the printed board inserted through an opening is formed on or in an inner wall of a case.

9 Claims, 20 Drawing Sheets

MEASURING PIPE PRESS FITTED IN A PIPE HOLE OF A CIRCUIT BOARD WITH A GUIDE PROVIDED ON AN INNER WALL OF A CASE BODY

CROSS-REFERENCE TO RELATED APPLICATIONS

The present application is based on and claims priority to Japanese Application No. 2018-045404, filed Mar. 13, 2018, the entire contents of which are incorporated herein by reference.

BACKGROUND

1. Field

The present disclosure relates to an electromagnetic flow meter for measuring a flow rate of a fluid that flows through a measuring pipe.

2. Description of the Related Art

There are two types of electromagnetic flow meters; namely a fluid contact type that an electrode disposed on an inner wall surface of a measuring pipe is brought into direct contact with a fluid, i.e., a measurement target, and electromotive force generated by the flowing fluid is detected, and a capacitive (fluid non-contact) type that a pair of surface electrodes are disposed on an outer surface of a measuring pipe, and electromotive force generated by a flowing fluid is detected through a capacitance between the fluid and each of the surface electrodes in a non-contact manner with respect to the fluid, i.e., the measurement target.

FIG. 18 is a sectional view illustrating a structure example of a capacitive electromagnetic flow meter. FIG. 19 is an explanatory view illustrating the measurement principle of the electromagnetic flow meter. Generally, the capacitive electromagnetic flow meter includes excitation coils 91A and 91B generating a magnetic flux Φ in a magnetic-flux direction Y orthogonal to a lengthwise direction X of a measuring pipe 90 through which a fluid flows, and a pair of surface electrodes 92A and 92B disposed away from each other in an electrode direction Z orthogonal to the magnetic flux Φ generated by the excitation coils 91A and 91B. A flow rate of the fluid flowing through the measuring pipe 90 is measured by detecting electromotive force generated between the surface electrodes 92A and 92B, while the polarities of excitation currents supplied to the excitation coils 91A and 91B are alternately switched over (see, e.g., Japanese Unexamined Patent Application Publication No. 2004-226394).

In the above capacitive electromagnetic flow meter, the electromotive force generated between the surface electrodes is amplified by a signal amplifier circuit (e.g., a differential amplifier circuit) and is converted to a digital signal by an A/D converter circuit. The digital signal is input to a program processor such as a microcontroller, and a measured value of the flow rate is calculated by executing a predetermined arithmetic process. Recently, the above capacitive electromagnetic flow meter has received considerable attention for the reason that the detection electrodes are less apt to deteriorate and maintenance is easy.

In the capacitive electromagnetic flow meter, however, because the fluid and the surface electrodes 92A and 92B are in a non-contact relation, the capacitance between the fluid and each of the surface electrodes 92A and 92B is very small, i.e., about several pF. Therefore, the impedance between the fluid and each of the surface electrodes 92A and 92B is very high, and the detection tends to be easily affected by noise. In addition, the magnitude of a flow rate signal (electromotive force) detected from the fluid is changed depending on positions and sizes of the surface electrodes 92A and 92B.

FIG. 20 is an explanatory view representing a contribution rate of the fluid in a pipe to the flow rate signal depending on the electrode positions. As seen from FIG. 20, assuming that a visual angle when looking at a center from opposite ends of each of the surface electrodes 92A and 92B is denoted by θ, a width of each of the surface electrode 92A and 92B is desirably held in a range of θ=1.4 rad or less (see, e.g., Japanese Unexamined Patent Application Publication No. 7-120282). Thus, if centers of the surface electrodes 92A and 92B are disposed at positions away from an axis P at which the flow rate signal is maximized, the obtained flow rate signal would be reduced and an S/N ratio would be worsened consequently.

Hitherto, a small-sized capacitive electromagnetic flow meter for the FA (factory automation) market has been proposed (see, e.g., Japanese Unexamined Patent Application Publication No. 2014-202662). In the proposed related art, as illustrated in FIGS. 21 and 22, a pipe unit is assembled by disposing the surface electrodes 92A and 92B on an outer circumferential surface of the measuring pipe 90, and fitting two board holders 94A and 94B to the measuring pipe 90 from above and below, respectively, so as to cover the outer sides of the surface electrodes 92A and 92B and preamplifier boards 93A and 93B.

Thereafter, the entirety of the pipe unit including the measuring pipe 90 is mounted to a case 96 by fitting mount holes formed in the lower board holder 94B to projections 97A of a yoke 97 that is attached to a bottom of the case 96. Thus, during assembly work of the capacitive electromagnetic flow meter, the pipe unit is mounted such that the centers of the surface electrodes 92A and 92B are aligned with the axis P.

However, the above related art has the following problem. Because, as illustrated in FIG. 21, the measuring pipe 90 is mounted to the case 96 with the aid of both the board holder 94B and the yoke 97, the board holder 94B for dedicated use is needed, and the yoke 97 is also needed to have a structure for supporting the board holder 94B. Thus, the structure and the assembly work for mounting the measuring pipe 90 to the case 96 are complicated.

SUMMARY

With intent to solve the above-mentioned problem, an object of the present disclosure is to provide an electromagnetic flow meter in which a measuring pipe can be easily mounted to a case without needing a complicated structure.

To achieve the above object, an electromagnetic flow meter according to the present disclosure includes a measuring pipe through which a fluid as a target to be measured flows, a bottom-equipped box-shaped case having an opening on the upper side and receiving the measuring pipe, a printed board having a pipe hole to which the measuring pipe is press-fitted, and a guide formed on or in an inner wall of the case and fitted to a side end portion of the printed board inserted through the opening.

In a structure example of the electromagnetic flow meter according to the present disclosure, the guide is a rib or a groove formed on or in the inner wall.

In another structure example of the electromagnetic flow meter according to the present disclosure, the electromagnetic flow meter includes plural sets of the printed boards and the guides.

In still another structure example of the electromagnetic flow meter according to the present disclosure, the printed board includes a board-side wiring pattern for connection to an electrode formed on the measuring pipe.

In still another structure example of the electromagnetic flow meter according to the present disclosure, the measuring pipe includes a pipe-side wiring pattern formed on an outer peripheral surface of the measuring pipe, the pipe-side wiring pattern having one end connected to the electrode and the other end extending up to near the printed board.

In still another structure example of the electromagnetic flow meter according to the present disclosure, the printed board includes a plurality of projections formed on a wall surface of the pipe hole and contacting with an outer peripheral surface of the measuring pipe.

In still another structure example of the electromagnetic flow meter according to the present disclosure, the printed board includes a cutout defining the pipe hole.

In still another structure example of the electromagnetic flow meter according to the present disclosure, the measuring pipe may be formed in a circular cylindrical shape, or may include a square cylindrical portion formed in a square cylindrical shape.

According to the present disclosure, the measuring pipe can be easily mounted to the case without needing any complicated structures, such as the board holders and the projections of the yokes, which are used in the related art, and without needing any dedicated attachment parts, such as spacers for holding the measuring pipe within the case. In other words, when joints are assembled to both ends of the measuring pipe from the outside of the case, the measuring pipe is in a state tightly positioned within the case, and rotation of the measuring pipe and deviation of the electrode position are avoided. Hence assembly work can be performed very easily and accurately.

DETAILED DESCRIPTION

Embodiments of the present disclosure will be described below with reference to the drawings.

First Embodiment

Figure 1:
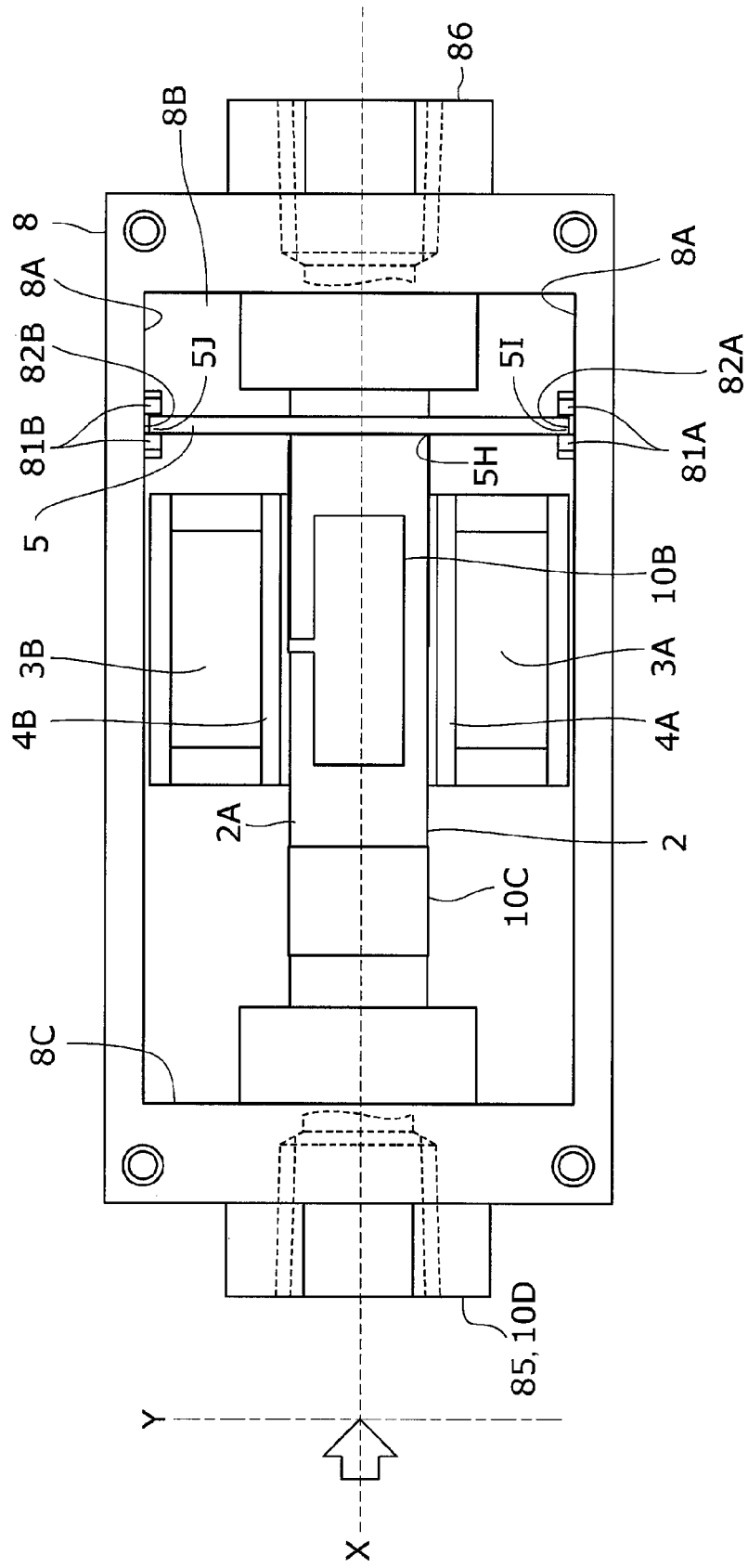
FIG. 1 is a plan view of an electromagnetic flow meter according to a first embodiment.
Figure 2:
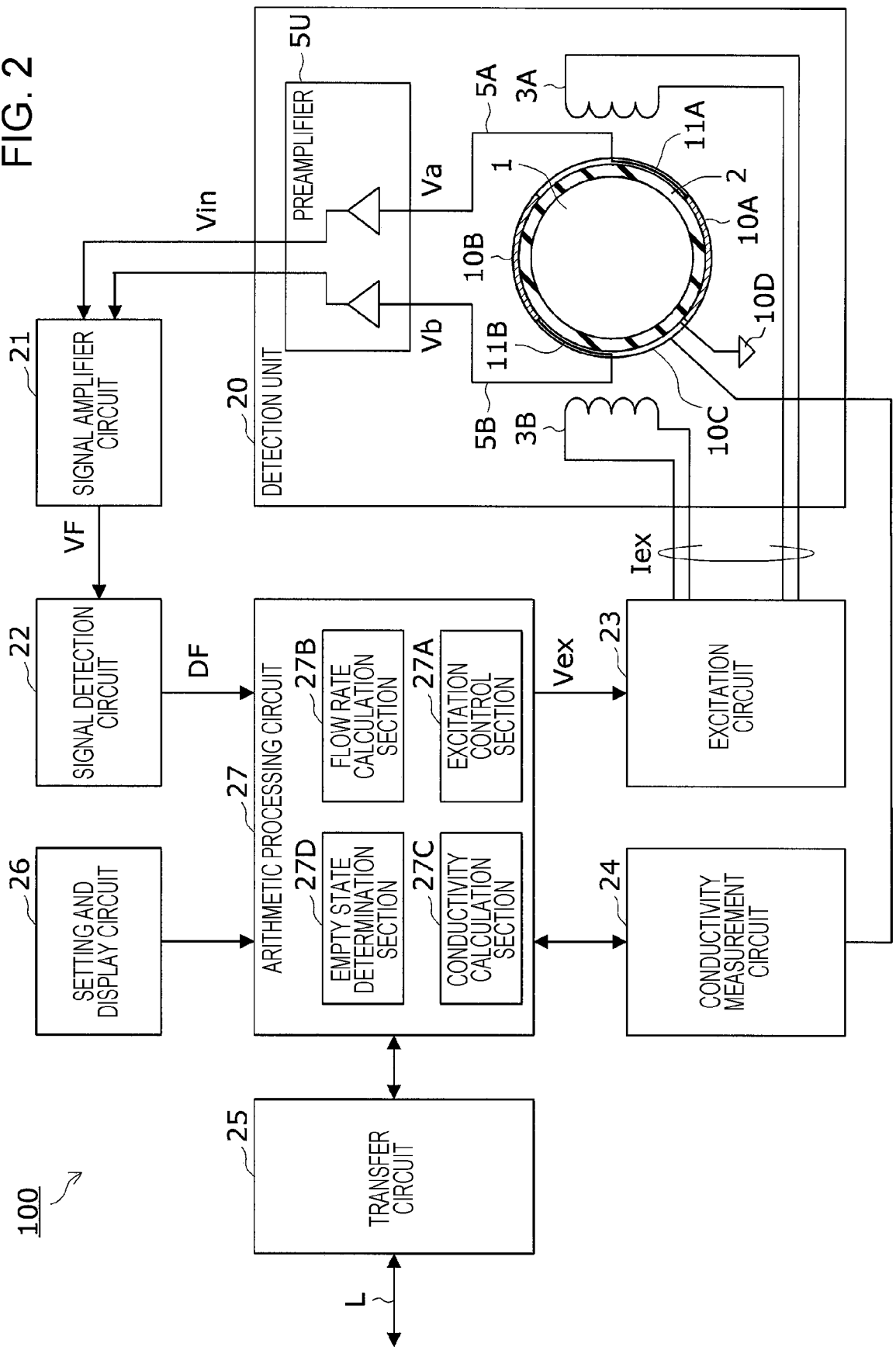
FIG. 2 is a block diagram illustrating a circuit configuration of the electromagnetic flow meter according to the first embodiment.

An electromagnetic flow meter according to a first embodiment of the present disclosure is first described with reference to FIGS. 1 and 2. FIG. 1 is a plan view of the electromagnetic flow meter according to the first embodiment. FIG. 2 is a block diagram illustrating a circuit configuration of the electromagnetic flow meter according to the first embodiment. The following description is made, by way of example, about a capacitive electromagnetic flow meter 100 in which a pair of detection electrodes is not in direct contact with a fluid flowing through a measuring pipe, but the present disclosure is not limited to that type of electromagnetic flow meter. The present disclosure can be similarly applied to an electromagnetic flow meter of fluid contact type that the pair of detection electrodes is in direct contact with the fluid.

As illustrated in FIG. 2, the capacitive electromagnetic flow meter 100 includes, as main unit and circuits, a detection unit 20, a signal amplifier circuit 21, a signal detection circuit 22, an excitation circuit 23, a conductivity (electrical conductivity) measurement circuit 24, a transfer circuit 25, a setting and display circuit 26, and an arithmetic processing circuit (CPU, etc.) 27.

The detection unit 20 includes, as main components, a measuring pipe 2, excitation coils 3A and 3B, surface electrodes 10A and 10B, and a preamplifier 5U. The detection unit 20 has the function of detecting, by the surface electrodes 10A and 10B, electromotive forces Va and Vb depending on a flow speed of a fluid that flows through a flow path 1 in the measuring pipe 2, and outputting an AC detection signal Vin corresponding to the electromotive forces Va and Vb.

An excitation control section 27A of the arithmetic processing circuit 27 outputs an excitation control signal Vex to switch over the polarities of AC excitation currents Iex in accordance with a preset excitation period. The excitation circuit 23 supplies the AC excitation currents Iex to the excitation coils 3A and 3B in accordance with the excitation control signal Vex from the excitation control section 27A of the arithmetic processing circuit 27.

The signal amplifier circuit 21 outputs an AC flow rate signal VF that is obtained by filtering a noise component in the detection signal Vin output from the detection unit 20, and by amplifying the detection signal after the filtering. The signal detection circuit 22 executes sample-holding of the flow rate signal VF from the signal amplifier circuit 21 and A/D-conversion of an obtained DC voltage to a flow rate amplitude value DF, and then outputs the flow rate amplitude value DF to the arithmetic processing circuit 27.

A flow rate calculation section 27B of the arithmetic processing circuit 27 calculates the flow rate of the fluid on the basis of the flow rate amplitude value DF from the signal detection circuit 22, and outputs a flow rate measurement result to the transfer circuit 25. The transfer circuit 25 executes data transfer to and from a host device via a transfer line L, thus sending the flow rate measurement result and an empty state determination result, which are obtained by the arithmetic processing circuit 27, to the host device.

The conductivity measurement circuit 24 applies an AC signal to a conductivity measurement electrode 10C through a resistance element in a state that the fluid flowing through the measuring pipe 2 is held at a common potential Vcom via a joint 85, for example. Furthermore, the conductivity measurement circuit 24 samples and A/D-converts the amplitude of an AC detection signal generated in the conductivity measurement electrode 10C at that time, and outputs AC amplitude value data DP obtained after the A/D-conversion to the arithmetic processing circuit 27.

A conductivity calculation section 27C of the arithmetic processing circuit 27 has the function of calculating the electrical conductivity of the fluid on the basis of the AC amplitude value data DP from the conductivity measurement circuit 24.

An empty state determination section 27D of the arithmetic processing circuit 27 has the function of determining, on the basis of the electrical conductivity of the fluid calculated by the conductivity calculation section 27C, whether the fluid is present in the measuring pipe 2.

Usually, the electrical conductivity of the fluid is higher than that of air. Thus, the empty state determination section 27D determines the presence of the fluid by executing threshold processing on the electrical conductivity of the fluid, which has been calculated by the conductivity calculation section 27C.

The setting and display circuit 26 detects a manual input from an operator, for example, and instructs arithmetic processing circuit 27 to execute various operations, such as the flow rate measurement, the conductivity measurement, and the empty state determination. In addition, the setting and display circuit 26 displays the flow rate measurement result and the empty state determination result, which are output from the arithmetic processing circuit 27, with a display circuit including LED, LCD or the like.

The arithmetic processing circuit 27 includes a CPU and peripheral circuits, and implements the operations of various processing sections, such as the excitation control section 27A, the flow rate calculation section 27B, the conductivity calculation section 27C, and the empty state determination section 27D, through cooperation of hardware and software by causing the CPU to execute preset programs.

Mount Structure of Measuring Pipe

Figure 3:
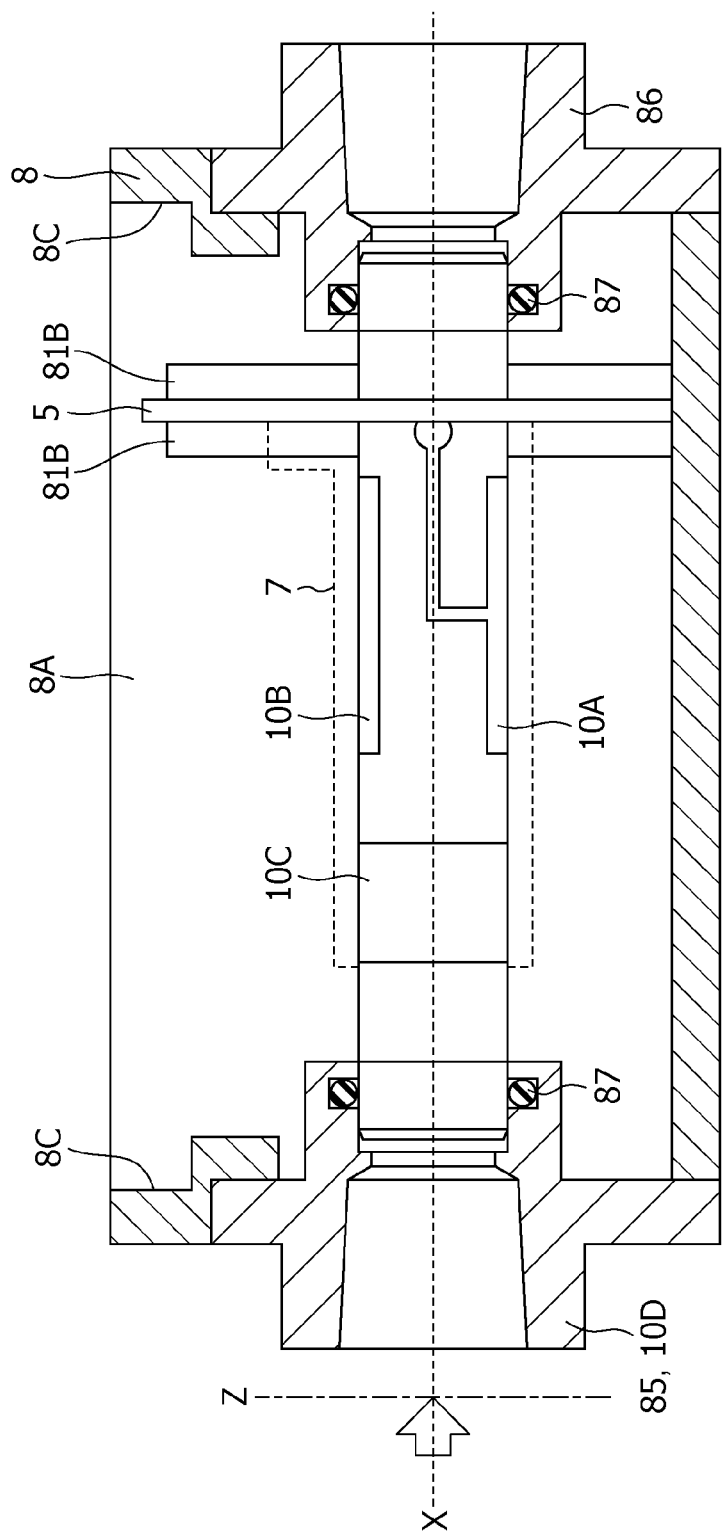
FIG. 3 is a side view of the electromagnetic flow meter according to the first embodiment.
Figure 4:
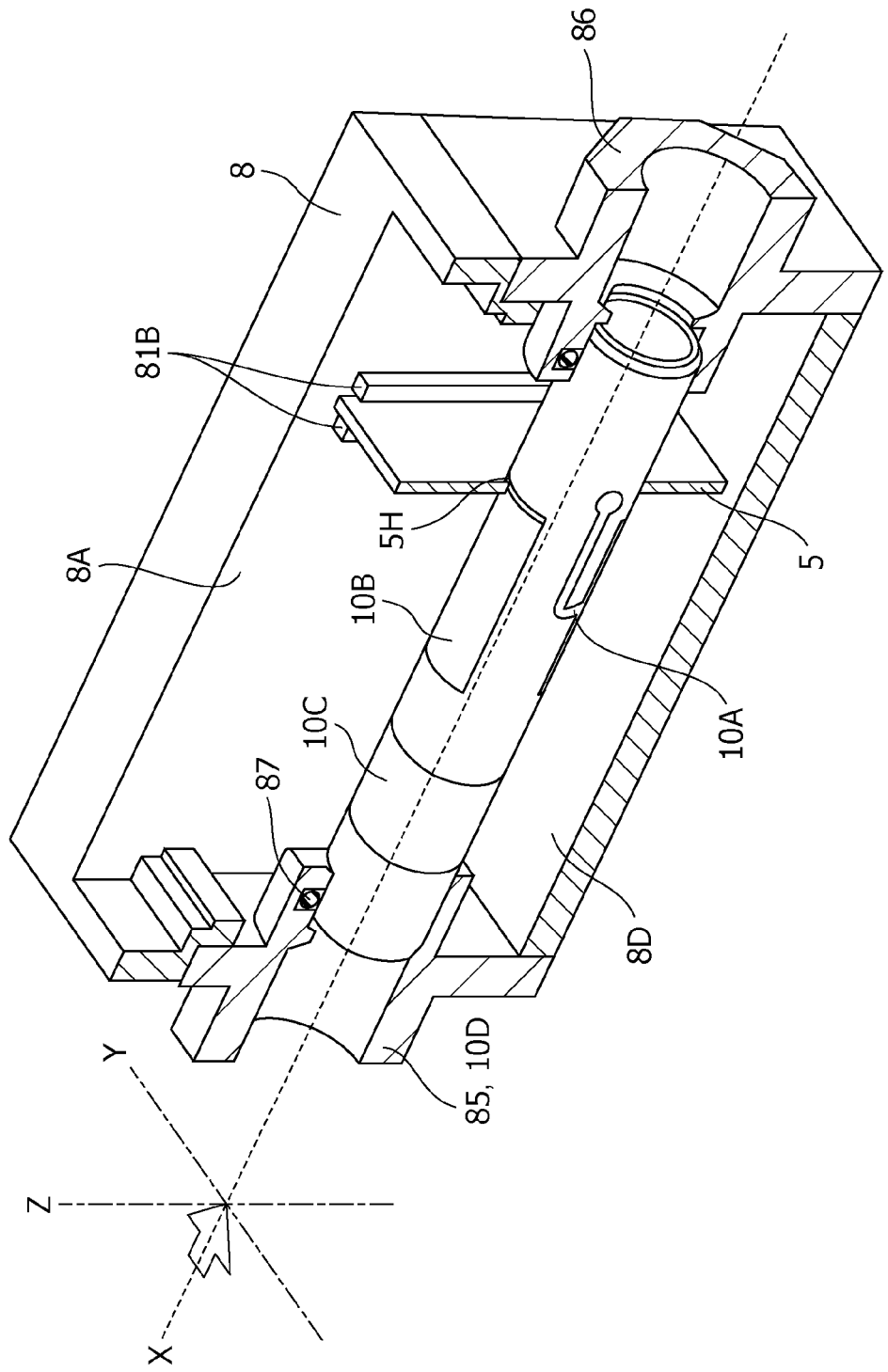
FIG. 4 is a sectional perspective view of the electromagnetic flow meter according to the first embodiment.

A mount structure of the measuring pipe 2 will be described in detail below with reference to FIGS. 1, 3 and 4. FIG. 3 is a side view of the electromagnetic flow meter according to the first embodiment. FIG. 4 is a sectional perspective view of the electromagnetic flow meter according to the first embodiment.

In this embodiment, the measuring pipe 2 is mounted to a case 8 by press-fitting the measuring pipe 2 to a pipe hole 5H formed in the printed board 5, and by inserting the measuring pipe 2 through an opening 8B of the case 8 in such a manner that that side end portions 5I and 5J of the printed board 5 are fitted respectively to guides 81A and 81B formed on inner walls 8A of the case 8.

As illustrated in FIG. 1, the measuring pipe 2 has a circular cylindrical shape and is made of a material having good insulating and dielectric properties, such as ceramic or resin. Outside the measuring pipe 2, a substantially C-shaped yoke (having the same shape as that of a yoke 4, for example, illustrated in FIG. 5) and the pair of excitation coils 3A and 3B are disposed opposite to each other in a relation sandwiching the measuring pipe 2 such that the magnetic flux direction (second direction) Y is orthogonal to the lengthwise direction (first direction) X of the measuring pipe 2. For easier understanding of the drawings, only yoke end surfaces opposite to each other, i.e., yoke surfaces 4A and 4B, are illustrated.

On the other hand, on an outer circumferential surface 2A of the measuring pipe 2, a pair of the surface electrode (first surface electrode) 10A and the surface electrode (second surface electrode) 10B made of thin-film conductors are disposed opposite to each other in the electrode direction (third direction) Z that is orthogonal to the lengthwise direction X and the magnetic flux direction (second direction) Y.

Thus, when the AC excitation currents Iex are supplied to the excitation coils 3A and 3B, the magnetic flux Φ is generated between the yoke surfaces 4A and 4B, which are positioned at respective centers of the excitation coils 3A and 3B, and AC electromotive forces are generated by the fluid flowing through the flow path 1 in magnitudes depending on the flow speed of the fluid along the electrode direction Z. The generated electromotive forces are detected by the surface electrodes 10A and 10B through capacitances between the fluid and both the surface electrodes 10A and 10B.

The case 8 is formed of a resin- or metal-made housing in the shape of a bottom-equipped box, the housing having the upper opening 8B and receiving the measuring pipe 2. The guides 81A and 81B are formed on a pair of inner walls 8A among four inner walls of the case 8 parallel to the lengthwise direction X at positions opposite to each other. The guides 81A and 81B are each constituted by two ribs formed parallel to the electrode direction Z, and the side end portions 5I and 5J of the printed board 5 inserted through the opening 8B are fitted respectively to fitting portions 82A and 82B that are each formed between the two ribs.

The ribs of the guides 81A and 81B are not always required to be formed continuously in the electrode direction Z, and they may be each formed by a plurality of parts separated at intervals allowing smooth insertion of the side end portions 5I and 5J. The guides 81A and 81B may be, instead of the ribs, grooves which are formed in the inner walls 8A and into which the side end portions 5I and 5J of the printed board 5 are inserted.

Pipe-shaped joints 85 and 86 made of a metal material (e.g., SUS) and capable of coupling pipes (not illustrated) disposed outside the electromagnetic flow meter 100 to the measuring pipe 2 are disposed at a pair of side surfaces 8C among four side surfaces of the case 8 parallel to the magnetic flux direction Y. The measuring pipe 2 is received in the case 8 along the lengthwise direction X, and the joints 85 and 86 are coupled to both end portions of the measuring pipe 2 with O-rings 87 interposed therebetween.

At least one of the joints 85 and 86 functions as a common electrode 10D as well. For example, the joint 85 is connected to the common potential Vcom and has the function of not only coupling an external pipe and the measuring pipe 2, but also operating as the common electrode 10D.

A contact area of the common electrode 10D with the fluid is increased by implementing the common electrode 10D with the joint 85 made of metal as mentioned above. Accordingly, even when adhesion of foreign matters or corrosion occurs on the common electrode 10D, an area of a portion where the adhesion of foreign matters or the corrosion has occurred is relatively small in comparison with a total area of the common electrode 10D. It is hence possible to suppress a measurement error caused by change of polarization capacitance.

Figure 5:
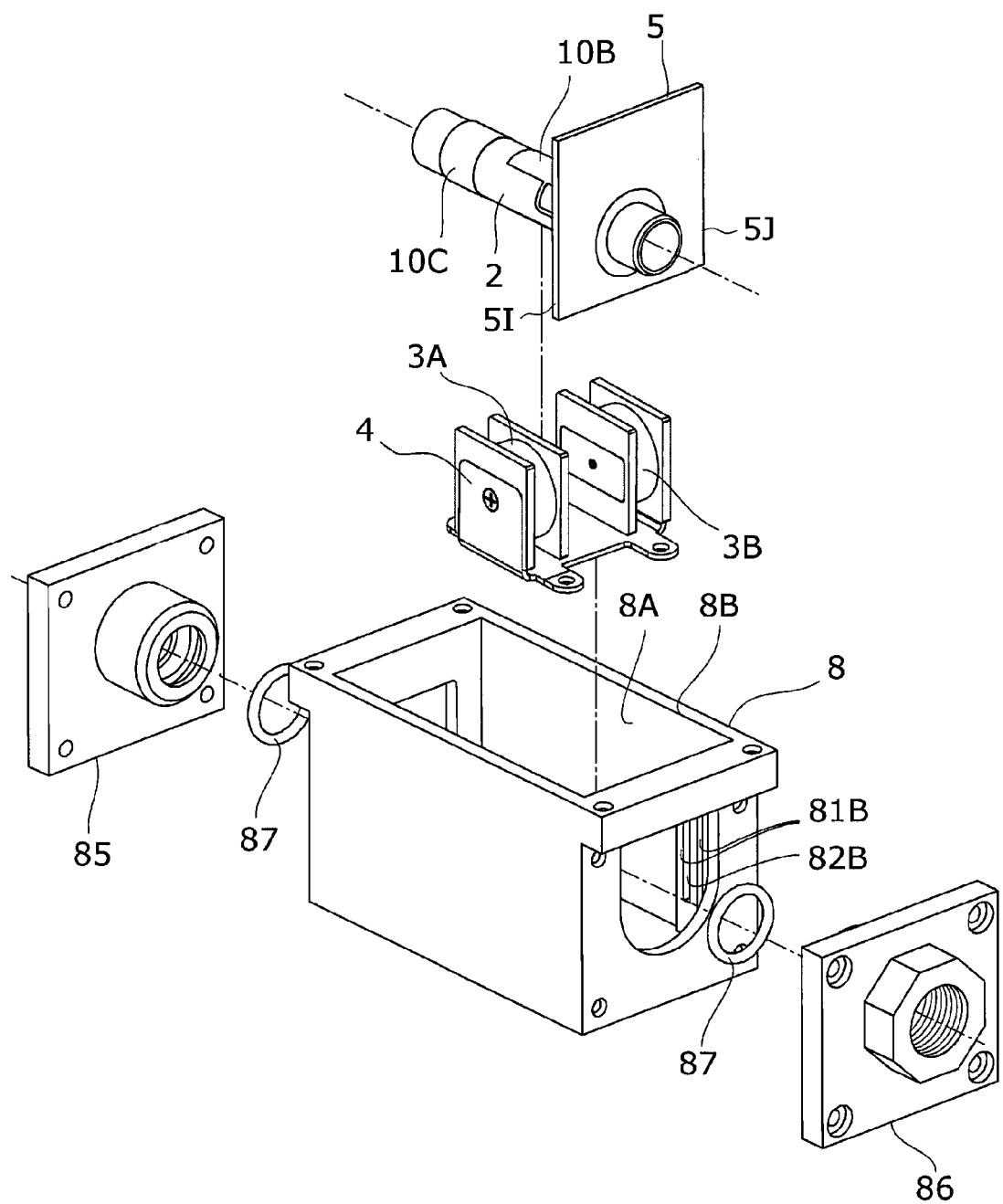
FIG. 5 is an assembly view of the electromagnetic flow meter according to the first embodiment.
Figure 7:
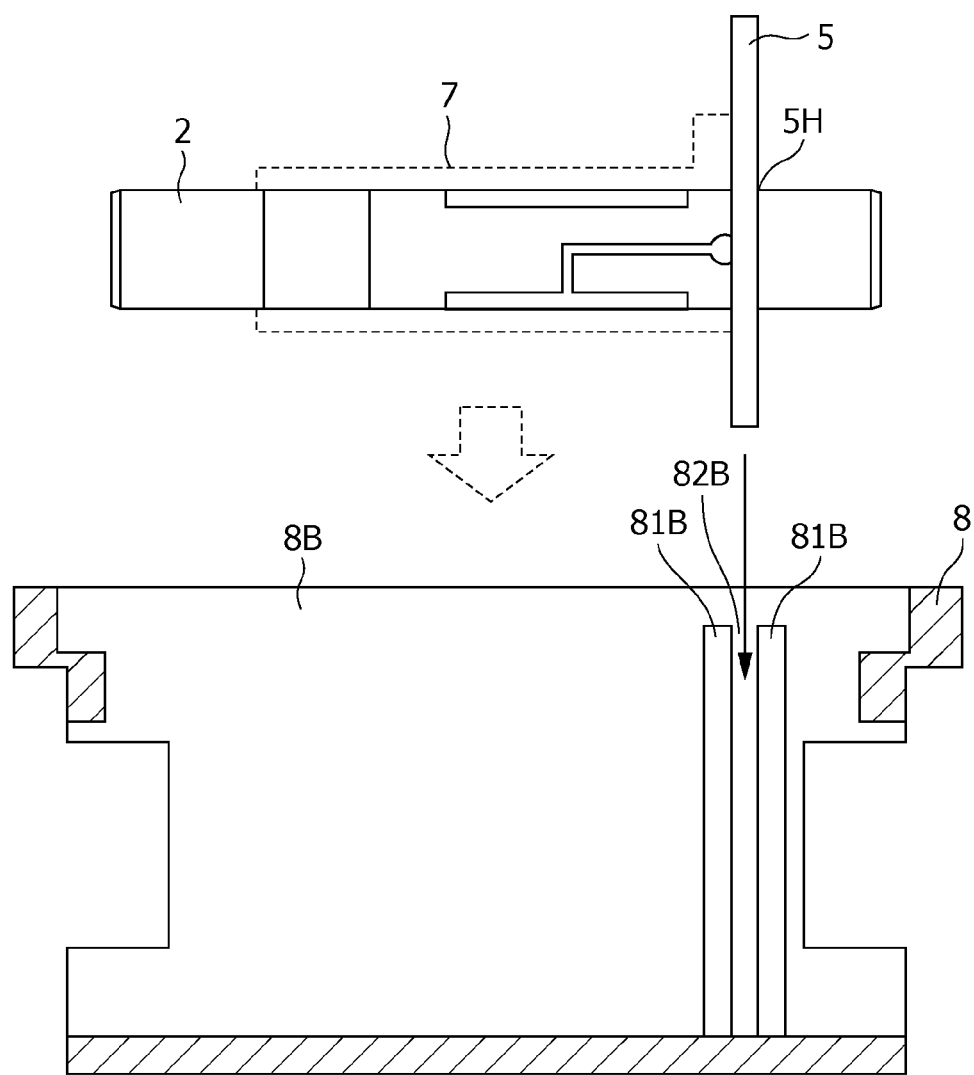
FIG. 7 is an explanatory view referenced to explain a state when the measuring pipe is inserted according to the first embodiment.
Figure 8:
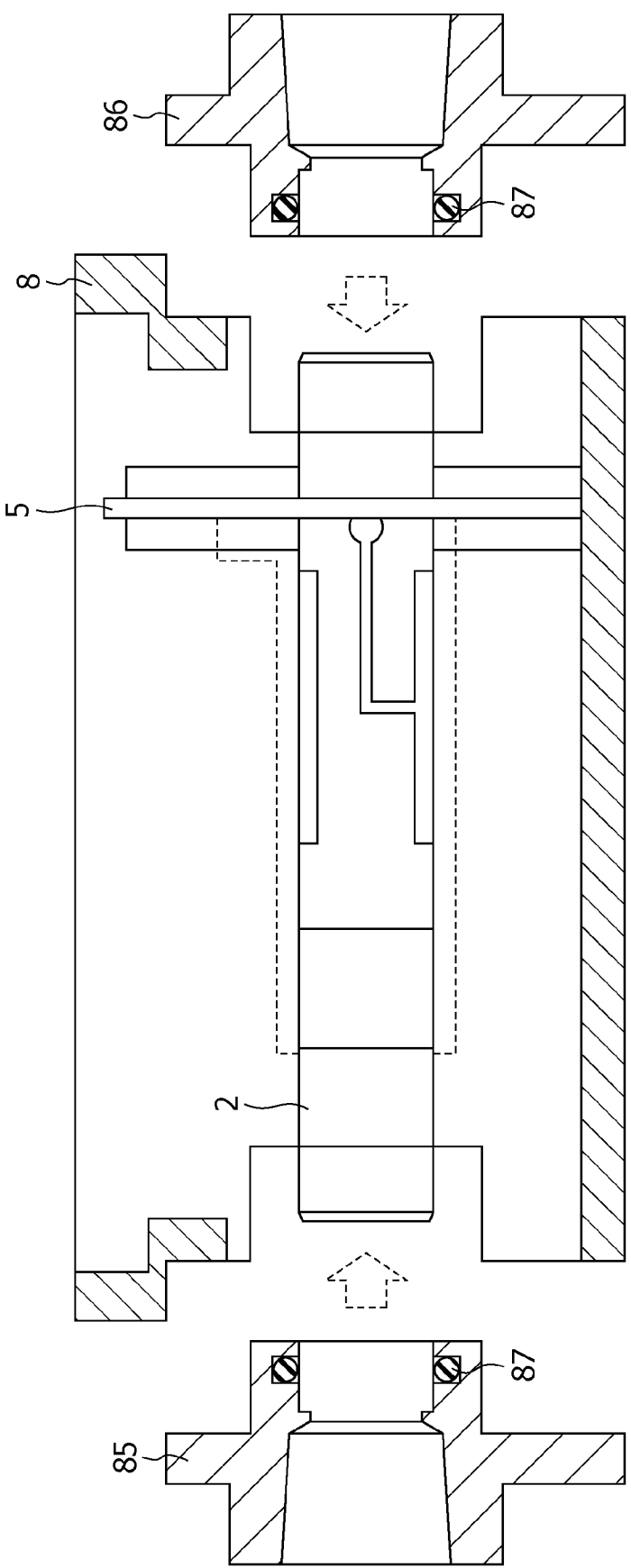
FIG. 8 is an explanatory view referenced to explain a state when joints are inserted according to the first embodiment.

FIG. 5 is an assembly view of the electromagnetic flow meter according to the first embodiment. FIG. 7 is an explanatory view referenced to explain a state when the measuring pipe is inserted according to the first embodiment. FIG. 8 is an explanatory view referenced to explain a state when the joints are inserted according to the first embodiment.

The printed board 5 is a general printed board (e.g., a copper-clad laminate made of a glass fabric base and an epoxy resin and having a sheet thickness of 1.6 mm) that is used for mounting electronic parts. As illustrated in FIG. 5, the pipe hole 5H allowing the measuring pipe 2 to penetrate therethrough is formed substantially at a center position of the printed board 5. Thus, the printed board 5 is mounted in a posture extending along a direction crossing the measuring pipe 2. A size of the pipe hole 5H is set to be the same as or slightly smaller than that of the outer circumference of the measuring pipe 2. The measuring pipe 2 is press-fitted to the pipe hole 5H and is tightly held on the printed board 5.

Figure 6:
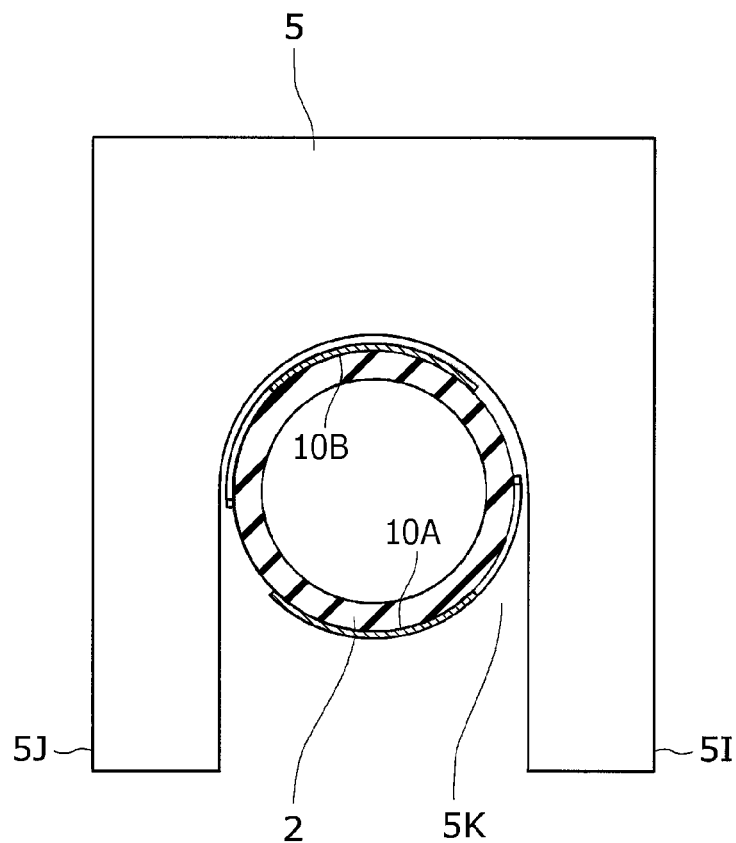
FIG. 6 is an explanatory view referenced to explain a positional relation between a measuring pipe and a printed board.

The outer circumferential surface 2A of the measuring pipe 2 and a circumferential wall (wall surface) of the pipe hole 5H may be fixed to each other using an adhesive. In the example illustrated in FIG. 5, the pipe hole 5H is not opened to any side ends of the printed board 5. As illustrated in FIG. 6, however, the circumferential wall of the pipe hole 5H may be partly cut out such that the pipe hole is directly opened to one side end of the printed board 5, thus forming a cutout 5K, or that the pipe hole is indirectly opened through a slit. In the former case, the cutout 5K formed in the printed board 5 defines the pipe hole to which the measuring pipe 2 is press-fitted.

When the measuring pipe 2 is assembled into the case 8, the yoke 4 to which the excitation coils 3A and 3B are mounted is first screwed to a bottom portion 8D of the case 8. In such a state, the printed board 5 including the measuring pipe 2 press-fitted to the pipe hole 5H is then inserted into the case 8 from the opening 8B of the case 8 such that the side end portions 5I and 5J are fitted respectively to the fitting portions 82A and 82B of the guides 81A and 81B of the case 8. Thereafter, the joints 85 and 86 are coupled to both the end portions of the measuring pipe 2 from the outside of the case 8 with the O-rings 87 interposed therebetween. Finally, the joints 85 and 86 are screwed to the case 8.

Thus, the printed board 5 is mounted to the inside of the case 8 with the measuring pipe 2 being press-fitted to the pipe hole 5H, whereby the measuring pipe 2 is mounted to the inside of the case 8 with the aid of the printed board 5. On that occasion, the printed board 5 is not required to be fixed by the guides 81A and 81B. Rather than being fixed, the printed board 5 is preferably held by the guides 81A and 81B with slight plays therebetween for the reason that mechanical stress is not applied to the measuring pipe 2 or the printed board 5 when the joints 85 and 86 are screwed to the case 8.

Figure 9:
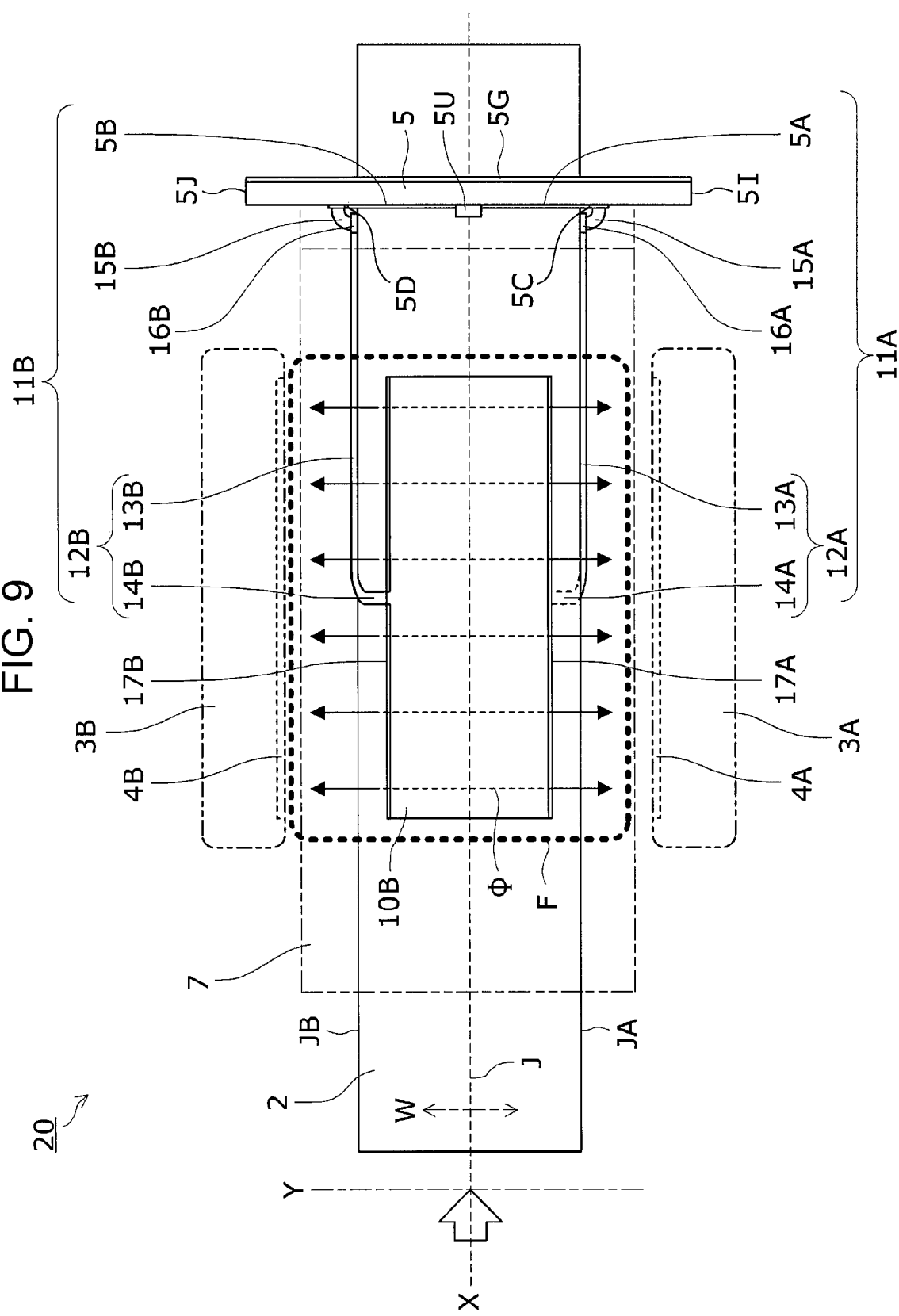
FIG. 9 is a plan view of a detection unit according to the first embodiment.
Figure 10:
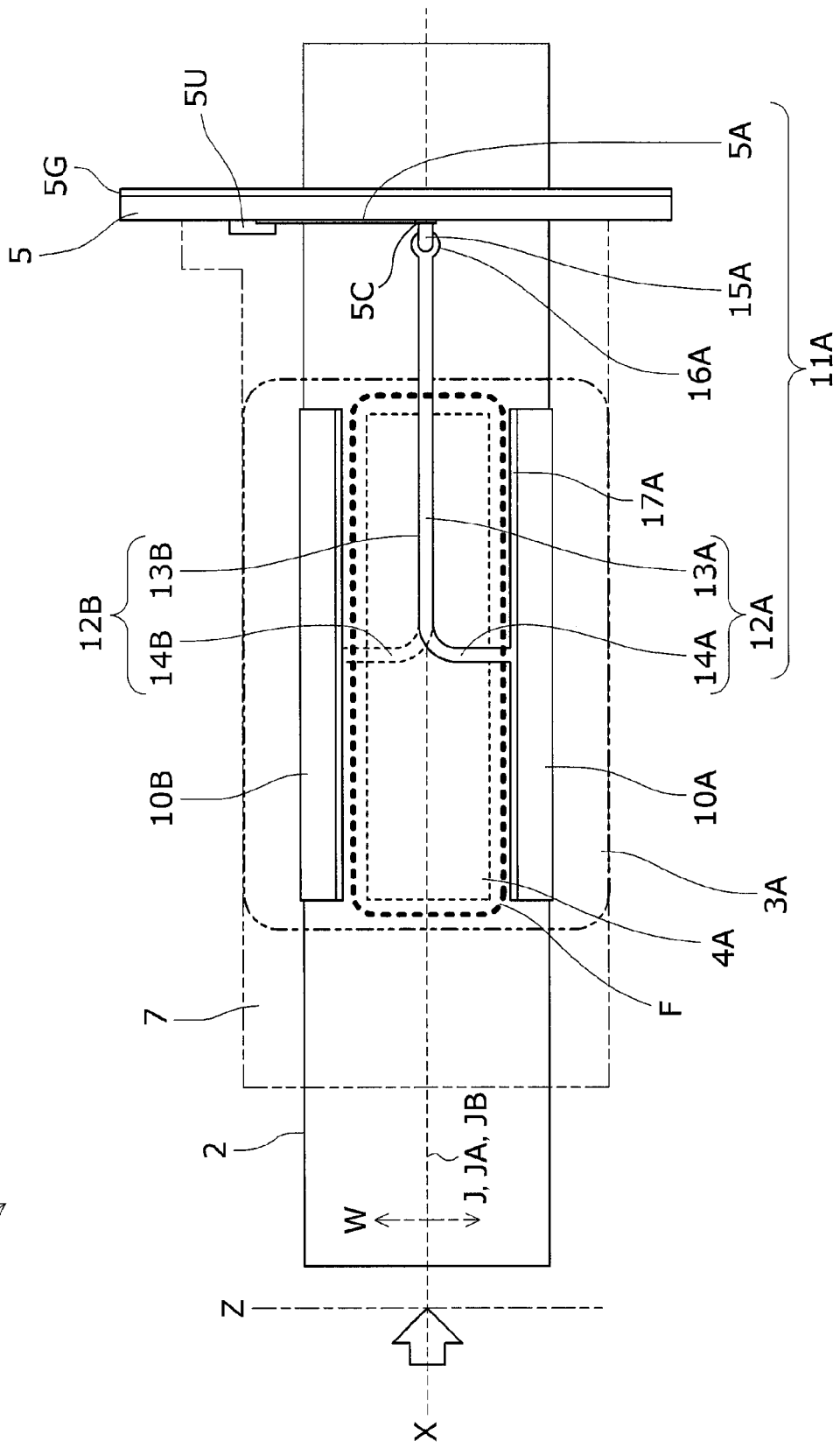
FIG. 10 is a side view of the detection unit according to the first embodiment.
Figure 11:
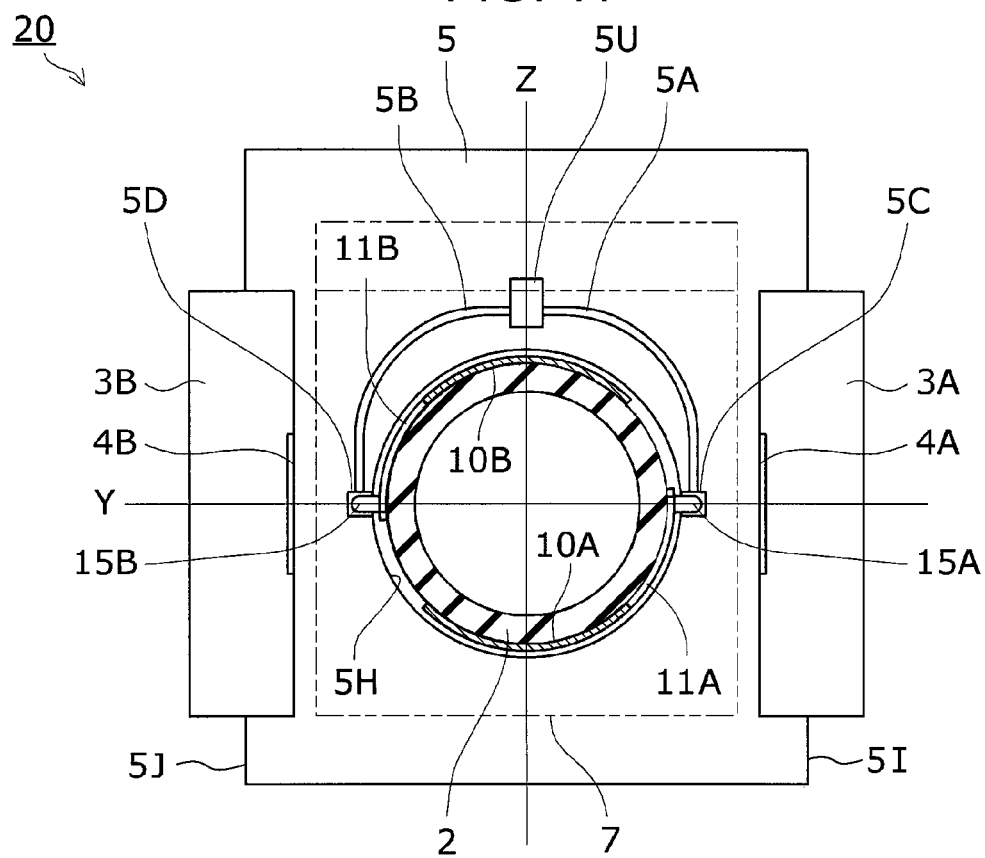
FIG. 11 is a front view of the detection unit according to the first embodiment.

FIG. 9 is a plan view of the detection unit according to the first embodiment. FIG. 10 is a side view of the detection unit according to the first embodiment. FIG. 11 is a front view of the detection unit according to the first embodiment.

The capacitance between the fluid and each of the surface electrodes 10A and 10B is very small, i.e., about several pF, and the impedance between the fluid and each of the surface electrodes 10A and 10B is very high. Therefore, the detection tends to be easily affected by noise. In consideration of the above point, impedances in taking out the electromotive forces Va and Vb obtained from the surface electrodes 10A and 10B are reduced with the preamplifier 5U using an operational amplifier IC, etc.

In this embodiment, the preamplifier 5U is mounted by attaching the printed board 5 to the measuring pipe 2 at a position outside a region where the magnetic flux Φ is generated between the yoke surfaces 4A and 4B of the excitation coils 3A and 3B, i.e., a magnetic flux region F, in a direction crossing the measuring pipe 2. The surface electrodes 10A and 10B are electrically connected to the preamplifier 5U via connection wirings 11A and 11B, respectively.

In the example illustrated in FIGS. 10 and 11, the printed board 5 is mounted at a position away from the magnetic flux region F toward the downstream side of the fluid flowing in the lengthwise direction X (denoted by an arrow). Furthermore, the printed board 5 is mounted, as described above, to extend in such a direction that the board surface crosses the measuring pipe 2; namely in a direction along a two-dimensional plane defined by the magnetic flux direction Y and the electrode direction Z in the illustrated example. The mounted position of the printed board 5 may be set to any desired position outside the magnetic flux region F, and may be set to a position away from the magnetic flux region F in the upstream direction opposing to the downstream direction. Moreover, the mounting direction of the printed board 5 is not limited to the direction along the above-described two-dimensional plane in a strict sense, and it may be inclined relative to the above-described two-dimensional plane.

The surface electrodes 10A and 10B, the connection wirings 11A and 11B, and the preamplifier 5U are electrically shielded by a shield case 7 made of a metal plate that is connected to a ground potential. The shield case 7 has a substantially rectangular parallelepiped shape extending in the lengthwise direction X, and openings allowing the measuring pipe 2 to penetrate therethrough are formed in the shield case 7 at positions away from the magnetic flux region F in the upstream direction and the downstream direction.

With the above-described structure, because the entirety of a circuit section having high impedance is shielded by a shield case 7, the influence of external noise is suppressed. Additionally, a shield pattern 5G made of a ground pattern (solid pattern) connected to the ground potential may be formed on a solder surface of the printed board 5 on the opposite side to the surface to which the preamplifier 5U is mounted. In that case, one of planes defining the shield case 7, the one coming into contact with the printed board 5, may be entirely opened. This enables the structure of the shield case 7 to be simplified.

The connection wirings 11A and 11B connect the surface electrodes 10A and 10B to the preamplifier 5U, and they may be a pair of general wiring cables because the connection wirings 11A and 11B are entirely shielded by the shield case 7 as described above. Both ends of each wiring cable may be soldered to pads formed on the surface electrode 10A or 10B and the printed board 5.

In this embodiment, as illustrated in FIGS. 10 and 11, pipe-side wiring patterns 12A and 12B formed on the outer circumferential surface 2A of the measuring pipe 2 are used as parts of the connection wirings 11A and 11B, respectively.

More specifically, the connection wiring 11A is constituted by the pipe-side wiring pattern 12A formed on the outer circumferential surface 2A and having one end connected to the surface electrode 10A, a board-side wiring pattern 5A formed on the printed board 5 and having one end connected to the preamplifier 5U, and a jumper line 15A connecting the pipe-side wiring pattern 12A and the board-side wiring pattern 5A. The jumper line 15A is soldered to a pad 16A formed at the other end of the pipe-side wiring pattern 12A, and to a pad 5C formed at the other end of the board-side wiring pattern 5A.

The connection wiring 11B is constituted by the pipe-side wiring pattern 12B formed on the outer circumferential surface 2A and having one end connected to the surface electrode 10B and the other end connected to a pad 16B for connection of a jumper line 15B that is disposed near the printed board 5, a board-side wiring pattern 5B formed on the printed board 5 and having one end connected to the preamplifier 5U, and a jumper line 15B connecting the pipe-side wiring pattern 12B and the board-side wiring pattern 5B. The jumper line 15B is soldered to the pad 16B formed at the other end of the pipe-side wiring pattern 12B, and to a pad 5D formed at the other end of the board-side wiring pattern 5B.

Thus, the pipe-side wiring patterns 12A and 12B formed on the outer circumferential surface 2A are used in zones of the connection wirings 11A and 11B spanning from the surface electrodes 10A and 10B up to positions near the printed board 5. In comparison with the above-mentioned case of using the pair of wiring cables, therefore, attachment work for the wiring cables, such as routing and fixing the cables, can be simplified, and the cost of the connection wirings and the burden of the wiring work can be reduced.

Furthermore, since the surface electrodes 10A and 10B and the pipe-side wiring patterns 12A and 12B are made of thin films of nonmagnetic metal (e.g., copper) and are formed integrally on the outer circumferential surface 2A of the measuring pipe 2 by a metallization process, the manufacturing process can be simplified, and the manufacturing cost can be reduced. The metallization process may be a plating process or a vapor deposition process, or may be performed by bonding the thin films of nonmagnetic metal, which have been formed in advance.

As illustrated in FIGS. 10 and 11, the pipe-side wiring pattern 12A includes a lengthwise wiring pattern 13A linearly formed along the lengthwise direction X on the outer circumferential surface 2A of the measuring pipe 2, and the pipe-side wiring pattern 12B includes a lengthwise wiring pattern 13B linearly formed along the lengthwise direction X on the outer circumferential surface 2A of the measuring pipe 2.

Because of the connection wirings 11A and 11B being partly positioned inside or near the magnetic flux region F, when the pair of wiring cables is used as the connection wirings 11A and 11B, a signal loop is formed due to a positional deviation between both the wiring cables as viewed from the magnetic flux direction Y, thus causing magnetic flux differential noise. In the case of using the wiring patterns formed on the outer circumferential surface 2A of the measuring pipe 2 as in this embodiment, positions of the connection wirings 11A and 11B can be accurately fixated. It is hence possible to avoid the positional deviation between both the wiring cables as viewed from the magnetic flux direction Y, and to easily suppress the occurrence of the magnetic flux differential noise.

Moreover, as illustrated in FIGS. 10 and 11, the pipe-side wiring pattern 12A includes a circumferential wiring pattern 14A formed on the outer circumferential surface 2A of the measuring pipe 2 along a circumferential direction W of the measuring pipe 2 in a state extending from a first end portion 17A of the surface electrode 10A along the lengthwise direction X to one end of the lengthwise wiring pattern 13A.

The pipe-side wiring pattern 12B includes a circumferential wiring pattern 14B formed on the outer circumferential surface 2A of the measuring pipe 2 along the circumferential direction W of the measuring pipe 2 in a state extending from a second end 17B of the surface electrode 10B along the lengthwise direction X to one end of the lengthwise wiring pattern 13B.

The lengthwise wiring pattern 13B is formed on the outer circumferential surface 2A of the measuring pipe 2 on the opposite side to the lengthwise wiring pattern 13A with the measuring pipe 2 interposed therebetween at a position overlapping with the lengthwise wiring pattern 13A as viewed in the magnetic flux direction Y. In other words, the lengthwise wiring patterns 13A and 13B are formed on the outer circumferential surface 2A at positions symmetrical relative to a plane passing a pipe axis J along the electrode direction Z.

In the example illustrated in FIGS. 10 and 11, the lengthwise wiring patterns 13A and 13B are formed respectively on cross lines JA and JB at which a plane passing the pipe axis J of the measuring pipe 2 along the magnetic flux direction Y crosses the outer circumferential surface 2A. One end of the circumferential wiring pattern 14A is connected to the first end portion 17A of the surface electrode 10A at a position corresponding to a center of the surface electrode 10A in the lengthwise direction X. Similarly, one end of the circumferential wiring pattern 14B is connected to the second end portion 17B of the surface electrode 10B at a position corresponding to a center of the surface electrode 10B in the lengthwise direction X.

Thus, since the lengthwise wiring patterns 13A and 13B are formed at the position overlapping with each other as viewed in the magnetic flux direction Y, the formation of the signal loop can be avoid reliably, and the occurrence of the magnetic flux differential noise can be suppressed easily.

Connection points between the circumferential wiring patterns 14A and 14B and the surface electrodes 10A and 10B are not always required to be the center positions of the surface electrodes 10A and 10B insofar as the circumferential wiring patterns 14A and 14B are connected respectively to the surface electrodes 10A and 10B at symmetrical positions relative to the pipe axis J, namely at identical positions of the surface electrodes 10A and 10B in the lengthwise direction X.

Furthermore, when the lengthwise wiring patterns 13A and 13B are formed to be positioned on the cross lines JA and JB, respectively, lengths of the circumferential wiring patterns 14A and 14B are equal to each other, and overall lengths of the pipe-side wiring patterns 12A and 12B are also equal to each other. It is hence possible to suppress unbalances in phase difference and amplitude, for example, between the electromotive forces Va and Vb obtained from the surface electrodes 10A and 10B, the unbalances being generated due to difference in lengths of the pipe-side wiring patterns 12A and 12B. If the unbalances are negligible in terms of measurement accuracy, the lengthwise wiring patterns 13A and 13B may not be positioned on the cross lines JA and JB, and they may be formed at the positions overlapping with each other as viewed from the magnetic flux direction Y.

Figure 12:
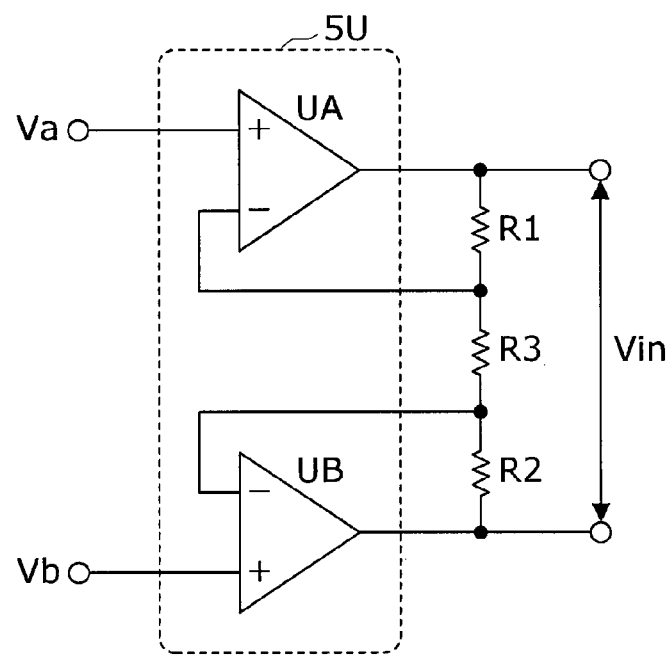
FIG. 12 is a diagram referenced to explain a configuration example of a differential amplifier circuit using a preamplifier.

FIG. 12 illustrates a configuration example of a differential amplifier circuit using a preamplifier. As illustrated in FIG. 12, the preamplifier 5U includes two operational amplifiers UA and UB that separately output the electromotive forces Va and Vb that are obtained from the surface electrodes 10A and 10B, while reducing impedances. The operational amplifiers UA and UB are encapsulated into one IC package (i.e., a dual operational amplifier). The operational amplifiers UA and UB differentially amplify the input Va and Vb, and outputs an obtained differential output, as the detection signal Vin, to the signal amplifier circuit 21 in FIG. 2.

More specifically, Va is input to a non-inverting input terminal (+) of UA, and Vb is input to a non-inverting input terminal (+) of UB. An inverting input terminal (−) of UA is connected to an output terminal of UA through a resistance element R1, and an inverting input terminal (−) of UB is connected to an output terminal of UB through a resistance element R2. The inverting input terminal (−) of UA is further connected to the inverting input terminal (−) of UB through a resistance element R3. In such a circuit, amplification factors of UA and UB become equal to each other by setting R1 and R2 to the same value. The amplification factor is determined depending on the values of R1, R2 and R3.

Because the electromotive forces Va and Vb obtained from the surface electrodes 10A and 10B are signals having opposite phases, Va and Vb are differentially amplified even when Va and Vb are susceptible to temperature drifts due to influences of heat applied from the excitation coils 3A and 3B and the measuring pipe 2 under condition that the differential amplifier circuit is constituted on the printed board 5 with the use of UA and UB. As a result, the above-described temperature drifts in the same phase are eventually cancelled in the detection signal Vin. Moreover, since Va and Vb are added, a higher S/N ratio can be obtained.

Figure 13:
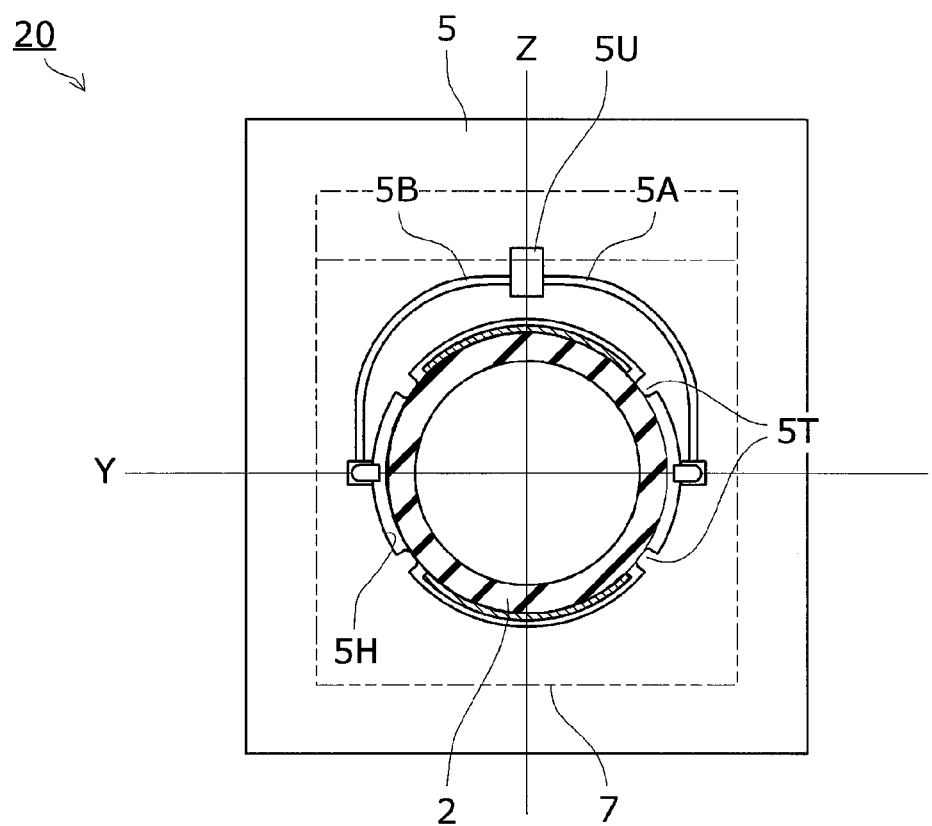
FIG. 13 is a front view of another detection unit according to the first embodiment.

FIG. 13 is a front view of another detection unit according to the first embodiment. As illustrated in FIG. 13, the printed board 5 mounting the preamplifier 5U may include projections 5T on a wall surface of the pipe hole 5H, and the projections 5T may contact with the outer circumferential surface 2A. With such a structure, since the wall surface of the pipe hole 5H is partly brought into contact with the outer circumferential surface 2A, the influence of heat transferred from the measuring pipe 2 to the preamplifier 5U can be suppressed in comparison with the structure in which the wall surface of the pipe hole 5H is entirely brought into contact with the outer circumferential surface 2A.

Furthermore, when press-fitting the measuring pipe 2 to the pipe hole 5H, the measuring pipe 2 can be more easily press-fitted with not only deformation of the projections 5T, but also the presence of gaps formed by the projections 5T between the wall surface of the pipe hole 5H and the outer circumferential surface 2A. Accordingly, a jig dedicated for the press-fitting is no longer required to be prepared, and the burden of work can be reduced.

Moreover, with the measuring pipe 2 press-fitted to the pipe hole 5H, the printed board 5 can be easily fixated, and the burden of work for soldering the jumper lines 15A and 15B to the pipe-side wiring patterns 12A and 12B and the board-side wiring patterns 5A and 5B can also be reduced.

Advantageous Effects of First Embodiment

In the first embodiment, as described above, the pipe hole 5H to which the measuring pipe 2 is to be press-fitted is formed in the printed board 5, and the guides 81A and 81B to be fitted respectively to the side end portions 5I and 5J of the printed board 5, which is inserted through the opening 8B, are formed on the inner walls 8A of the case 8.

Thus, the printed board 5 is mounted to the inside of the case 8, whereby the measuring pipe 2 is mounted to the inside of the case 8 with the aid of the printed board 5.

Accordingly, the measuring pipe 2 can be easily mounted to the case 8 without needing any complicated structures, such as the board holders and the projections of the yokes, which are used in the related art, and without needing any dedicated attachment parts, such as spacers for holding the measuring pipe 2 within the case 8. In other words, when the joints 85 and 86 are assembled to both the ends of the measuring pipe 2 from the outside of the case 8, the measuring pipe 2 is in the state tightly positioned within the case 8, and rotation of the measuring pipe 2 and deviation of the positions of the surface electrodes 10A and 10B are avoided. Hence assembly work can be performed very easily and accurately.

In this embodiment, the guides 81A and 81B may be constituted by convex or concave rails formed on or in the inner walls 8A of the case 8. Those rails enable the printed board 5 and hence the measuring pipe 2 to be mounted to the inside of the case 8 with a very simple structure. Regarding the guides 81A and 81B, the convex or concave rails are not always required to be formed to extend continuously, and they may be each formed by a plurality of parts separated at intervals allowing smooth insertion of the side end portions 5I and 5J.

Because the joints 85 and 86 are assembled to both the ends of the measuring pipe 2 from the outside of the case 8, the measuring pipe 2 is finally fixed to the case 8 with the aid of the joints 85 and 86. Therefore, the printed board 5 is not required to be fixed by the guides 81A and 81B. Rather than being fixed, the printed board 5 is preferably held by the guides 81A and 81B with slight plays for the reason that mechanical stress is not applied to the measuring pipe 2 or the printed board 5 when the joints 85 and 86 are screwed to the case 8.

In this embodiment, the board-side wiring patterns 5A and 5B for connection to the surface electrodes 10A and 10B disposed on the measuring pipe 2 are formed on the printed board 5, and the pipe-side wiring patterns 12A and 12B having one-side ends connected to the surface electrodes 10A and 10B and opposite-side ends extending up to the printed board 5 are formed on the outer circumferential surface 2A of the measuring pipe 2. Therefore, the printed board 5 can be used not only to mount the measuring pipe 2, but also to route the connection wirings for the surface electrodes 10A and 10B. As a result, the entire structure can be greatly simplified, and size reduction of the capacitive electromagnetic flow meter can be realized to be adapted for the demands in the FA market.

Second Embodiment

Figure 14:
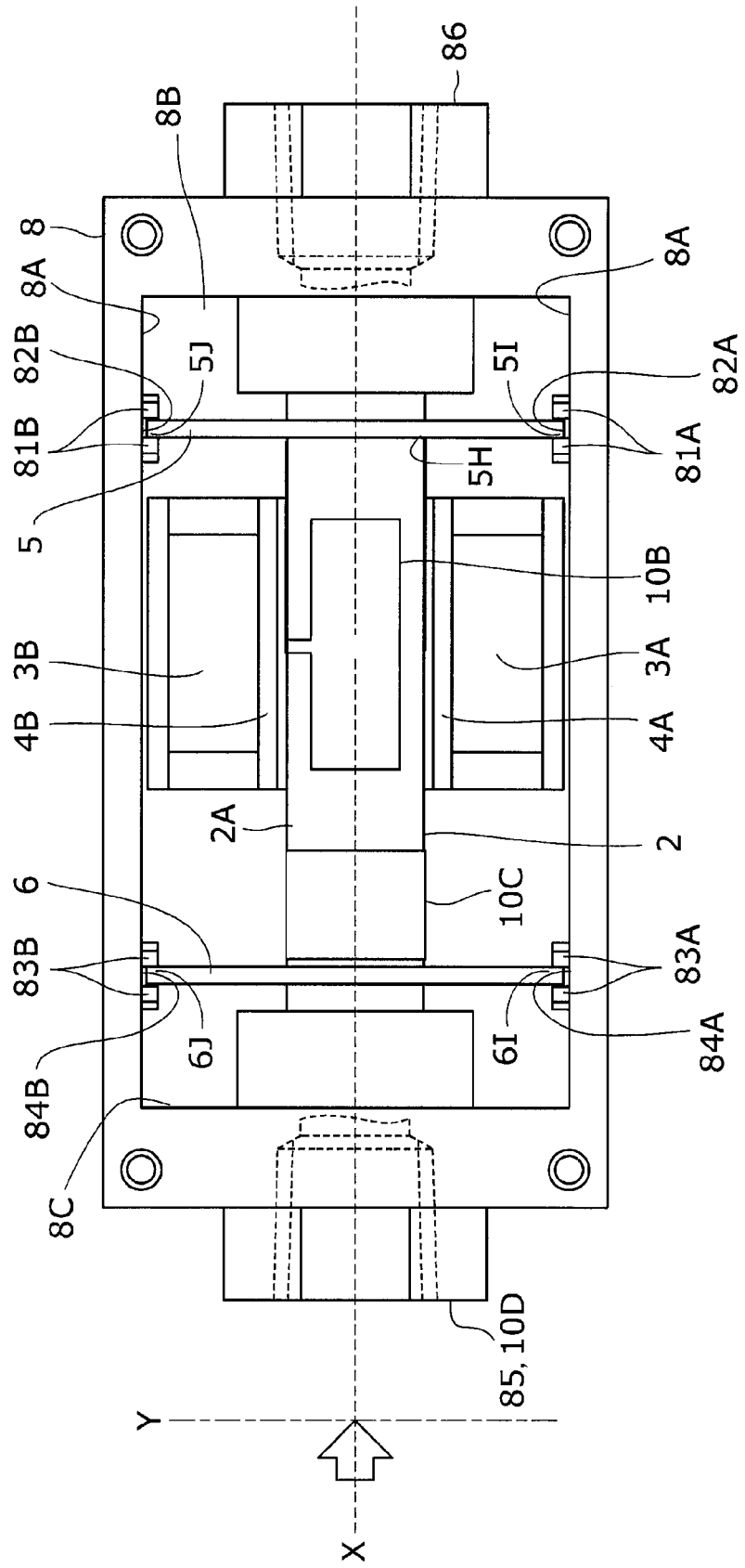
FIG. 14 is a plan view of an electromagnetic flow meter according to a second embodiment.
Figure 15:
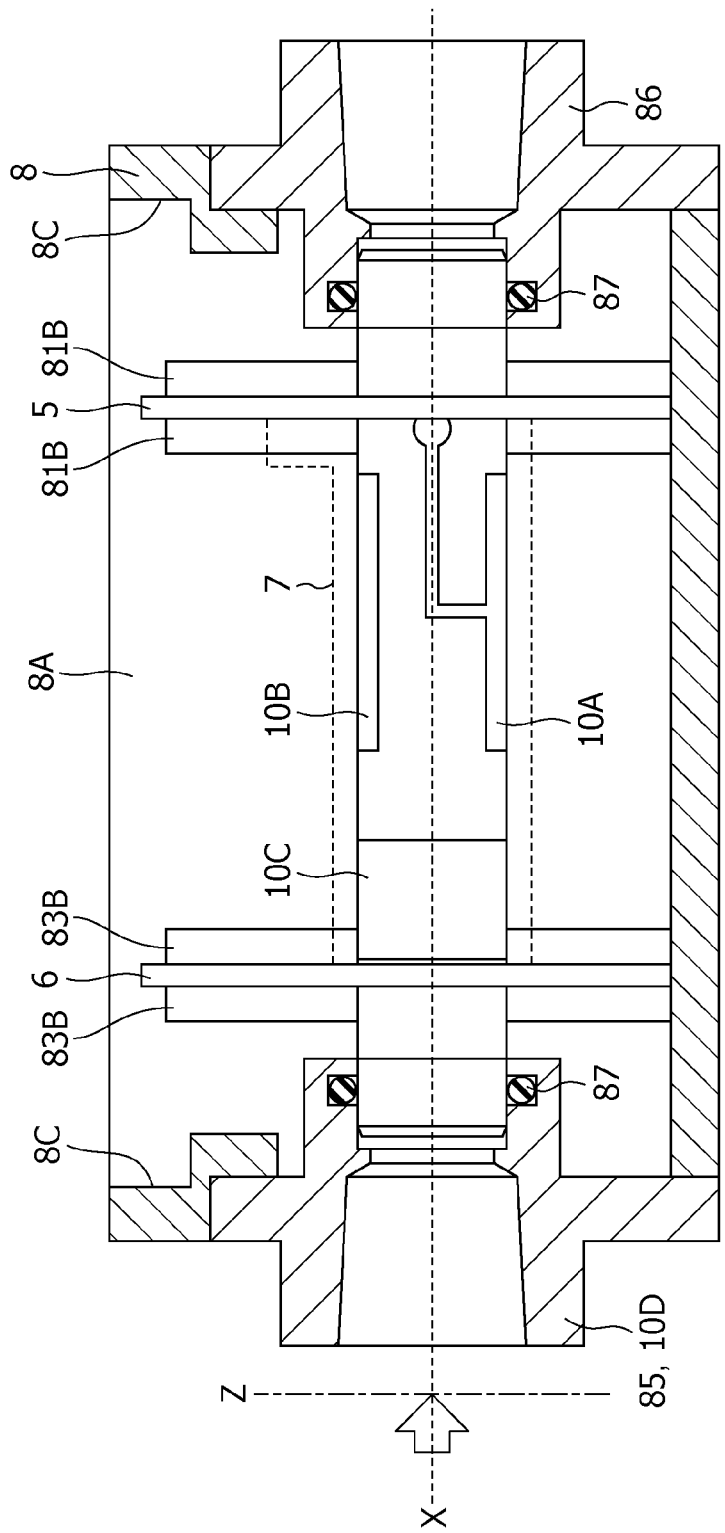
FIG. 15 is a side view of the electromagnetic flow meter according to the second embodiment.

An electromagnetic flow meter according to a second embodiment will be described below with reference to FIGS. 14 and 15. FIG. 14 is a plan view of the electromagnetic flow meter according to the second embodiment. FIG. 15 is a side view of the electromagnetic flow meter according to the second embodiment.

The case of disposing two sets of the printed board and the guides is described in this embodiment.

Like the printed board 5, a printed board 6 is a general printed board (e.g., a copper-clad laminate made of a glass fabric base and an epoxy resin and having a sheet thickness of 1.6 mm) that is used for mounting electronic parts. A pipe hole 6H allowing the measuring pipe 2 to penetrate therethrough is formed substantially at a center position of the printed board 6. Thus, the printed board 6 is mounted in a posture extending along a direction crossing the measuring pipe 2. A size of the pipe hole 6H is set to be the same as or slightly smaller than that of the outer circumference of the measuring pipe 2.

Furthermore, as in the printed board 5, the pipe hole 6H is not opened to any side ends of the printed board 6, but, as illustrated in FIG. 6, a circumferential wall of the pipe hole 6H may be partly cut out such that the pipe hole is directly opened to one side end of the printed board 5, thus forming a cutout 5K, or that the pipe hole is indirectly opened through a slit. In the former case, the cutout 5K formed in the printed board 5 defines the pipe hole to which the measuring pipe 2 is to be press-fitted.

Moreover, as in the printed board 5, projections may be provided on a wall surface of the pipe hole 6H, and those projections may be brought into contact with the outer circumferential surface 2A, as illustrated in FIG. 13.

As illustrated in FIGS. 14 and 15, in addition to the guides 81A and 81B, guides 83A and 83B are formed respectively on the pair of inner walls 8A among the four inner walls of the case 8, parallel to the lengthwise direction X, at positions opposite to each other. The guides 83A and 83B are each constituted by two ribs formed parallel to the electrode direction Z, and the side end portions 61 and 6J of the printed board 6 inserted through the opening 8B are fitted respectively to fitting portions 84A and 84B that are each formed between the two ribs.

The ribs of the guides 83A and 83B are not always required to be formed continuously in the electrode direction Z, and they may be each formed by a plurality of parts separated at intervals allowing smooth insertion of the side end portions 61 and 6J. The guides 83A and 83B may be, instead of the ribs, grooves which are formed in the inner walls 8A and into which the side end portions 61 and 6J of the printed board 6 are inserted.

Thus, the printed boards 5 and 6 are mounted to the inside of the case 8 with the measuring pipe 2 being press-fitted to the pipe holes 5H and 6H, whereby the measuring pipe 2 is mounted to the inside of the case 8 with the aid of the printed boards 5 and 6. On that occasion, the printed boards 5 and 6 are not required to be fixed by the guides 81A, 81B, 83A and 83B. Rather than being fixed, the printed boards 5 and 6 are preferably held by those guides with slight plays therebetween for the reason that mechanical stress is not applied to the measuring pipe 2 or the printed boards 5 and 6 when the joints 85 and 86 are screwed to the case 8.

As described above, in order to measure the conductivity (electrical conductivity) of the fluid, the conductivity measurement electrode 10C needs to be disposed separately from the surface electrodes 10A and 10B, and the conductivity measurement electrode 10C is disposed on the outer circumferential surface 2A of the measuring pipe 2 at the position away from the magnetic flux region F. Thus, by disposing the printed board 6 near the conductivity measurement electrode 10C as illustrated in FIGS. 14 and 15, part of the circuit and wirings for connection of the conductivity measurement electrode 10C can be disposed on the printed board 6.

Figure 16:
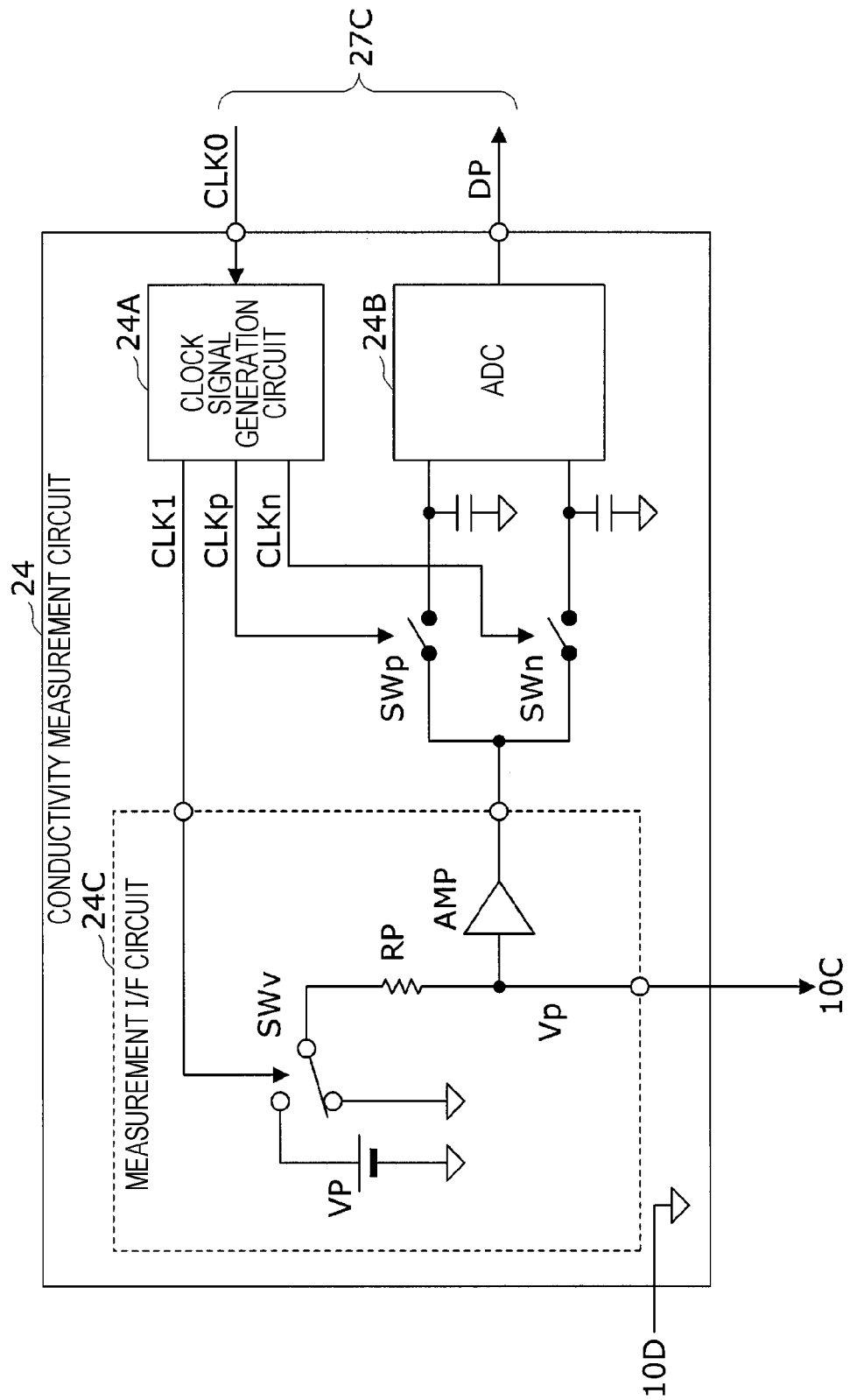
FIG. 16 is a diagram referenced to explain a configuration example of a conductivity (electrical conductivity) measurement circuit.

FIG. 16 illustrates a configuration example of the conductivity measurement circuit 24. The conductivity measurement circuit 24 includes, as main circuit sections, a clock signal generation circuit 24A, an A/D converter 24B, and a measurement I/F circuit 24C.

Three clock signals CLK1, CLKp, and CLKn are generated by the clock signal generation circuit 24A in accordance with a clock signal CLK0 output from the conductivity calculation section 27C in the arithmetic processing circuit 27.

By turning on and off a switch SWv in accordance with CLK1, the measurement I/F circuit 24C generates an AC signal having the amplitude of a voltage VP, and applies the AC signal to the conductivity measurement electrode 10C through a resistance element RP.

A detection signal Vp generated in the conductivity measurement electrode 10C at that time is amplified by an amplifier AMP of the measurement I/F circuit 24C. Thereafter, a high level and a low level of Vp are sampled by controlling switches SWp and SWn in accordance with CLKp and CLKn, respectively. Sampled values are A/D-converted by the A/D converter 24B, and obtained detection data Dp is output to the arithmetic processing circuit 27 (conductivity calculation section 27C). The conductivity calculation section 27C calculates the electrical conductivity of the fluid on the basis of the amplitude voltage of Vp, which is indicated by the detection data Dp from the conductivity measurement circuit 24.

In the above-described process, the impedance of the conductivity measurement electrode 10C is very high, and the measurement tends to be easily affected by noise. Accordingly, the measurement I/F circuit 24C is desirably disposed as close as to the conductivity measurement electrode 10C. From that point of view, in this embodiment, the measurement I/F circuit 24C is mounted to the printed board 6.

The printed board 6 and the conductivity measurement electrode 10C may be connected through a jumper line 15C. This greatly reduces the length of a connection wiring between the conductivity measurement electrode 10C and the measurement I/F circuit 24C. Furthermore, the impedance in taking out the detection signal Vp can be reduced with the amplifier AMP. As a result, the influence of noise can be reduced.

Advantageous Effects of Second Embodiment

In the second embodiment, as described above, the pipe hole 6H to which the measuring pipe 2 is to be press-fitted is formed in the printed board 6, and the guides 83A and 83B to be fitted respectively to the side end portions 61 and 6J of the printed board 6, which is inserted through the opening 8B, are formed on the inner walls 8A of the case 8.

Thus, both the printed boards 5 and 6 are mounted to the inside of the case 8, whereby the measuring pipe 2 is mounted to the inside of the case 8 with the aid of both the printed boards 5 and 6. Accordingly, the measuring pipe 2 can be more stably mounted and the assembly work can be more efficiently performed in comparison with the case of using only the printed board 5.

In this embodiment, the measurement I/F circuit 24C may be incorporated into the printed board 6 to be positioned near the conductivity measurement electrode 10C, and may be electrically connected to the conductivity measurement electrode 10C. With such a structure, the printed board 6 can be used not only to mount the measuring pipe 2, but also to route the connection wirings for the measurement I/F circuit 24C and the conductivity measurement electrode 10C. As a result, the entire structure can be greatly simplified, and size reduction of the capacitive electromagnetic flow meter can be realized to be adapted for the demands in the FA market.

Extensions of Embodiments

Although the present disclosure has been described with reference to the embodiments, the present disclosure is not limited to those embodiments. The constitution and details of the present disclosure can be variously modified in manners conceivable by those skilled in the art within the scope of the present disclosure. In addition, the embodiments can be optionally combined with each other insofar as not causing inconsistency.

Figure 17A:
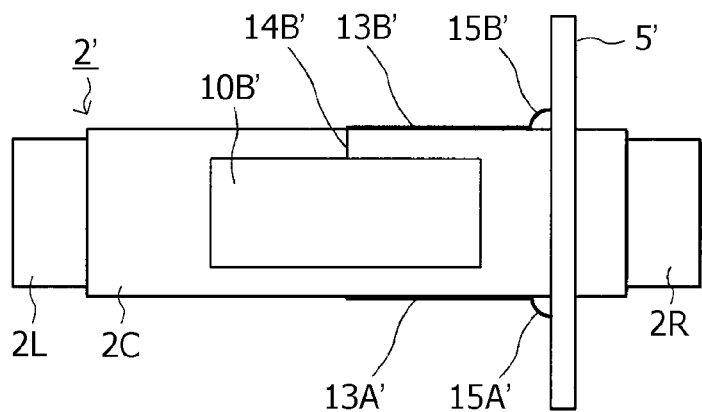
FIGS. 17A, 17B, 17C and 17D are explanatory views referenced to explain other structure examples of the measuring pipe.
Figure 17B:
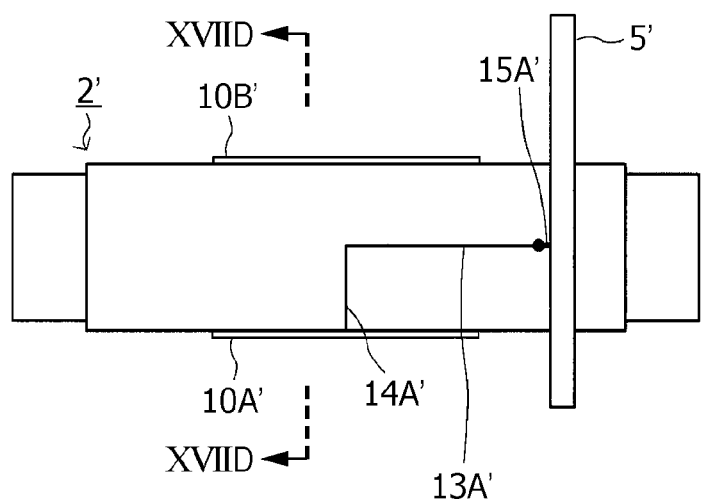
Figure 17C:
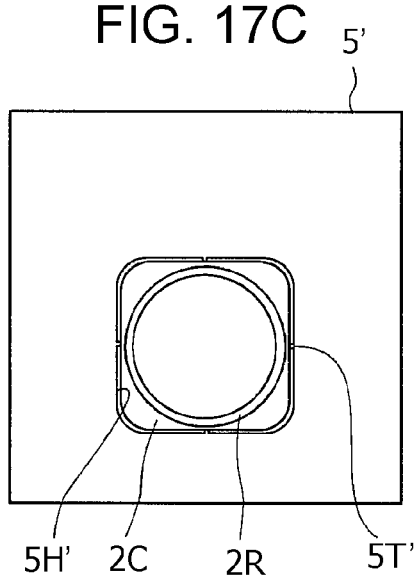
Figure 17D:
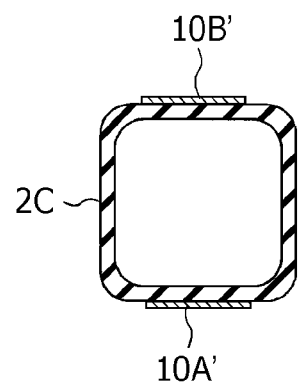
Figure 18:
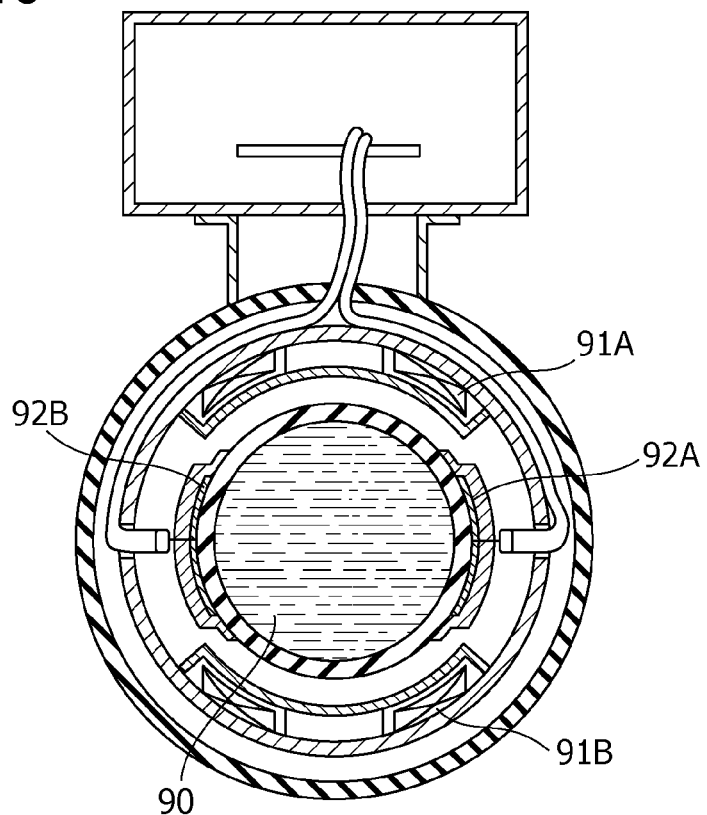
FIG. 18 is a sectional view illustrating a structure example of a capacitive electromagnetic flow meter.
Figure 19:
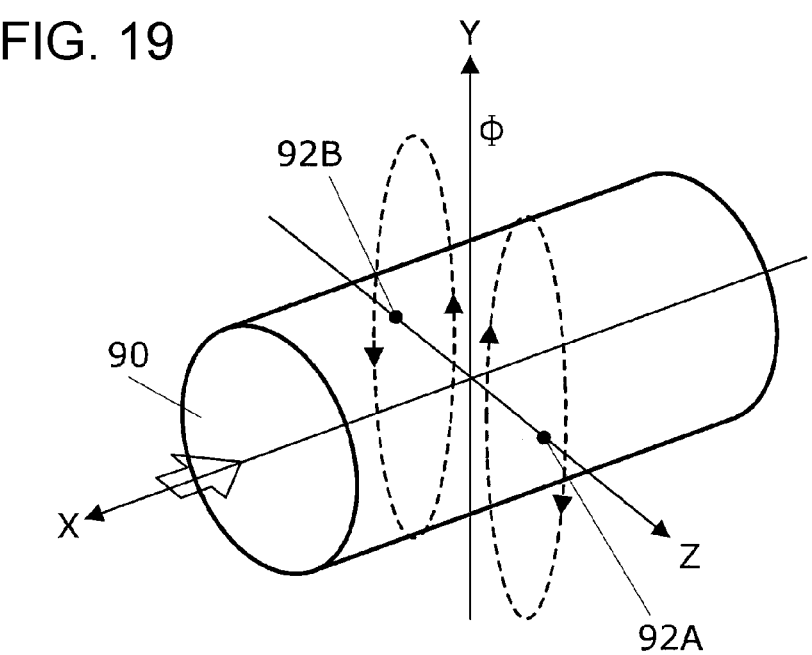
FIG. 19 is an explanatory view illustrating the measurement principle of the electromagnetic flow meter.
Figure 20:
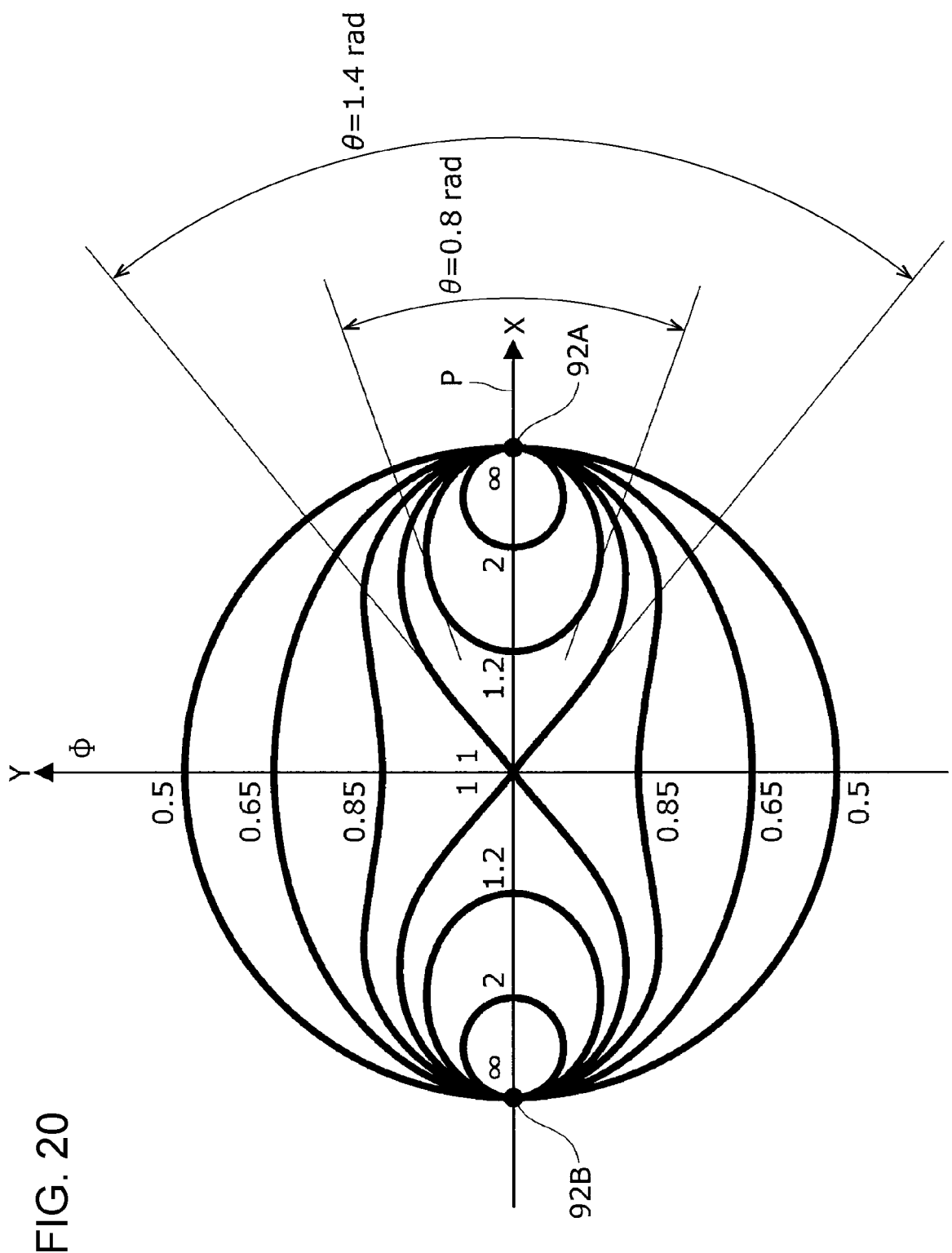
FIG. 20 is an explanatory view representing a contribution rate of a fluid in a pipe to a flow rate signal depending on electrode positions.
Figure 21:
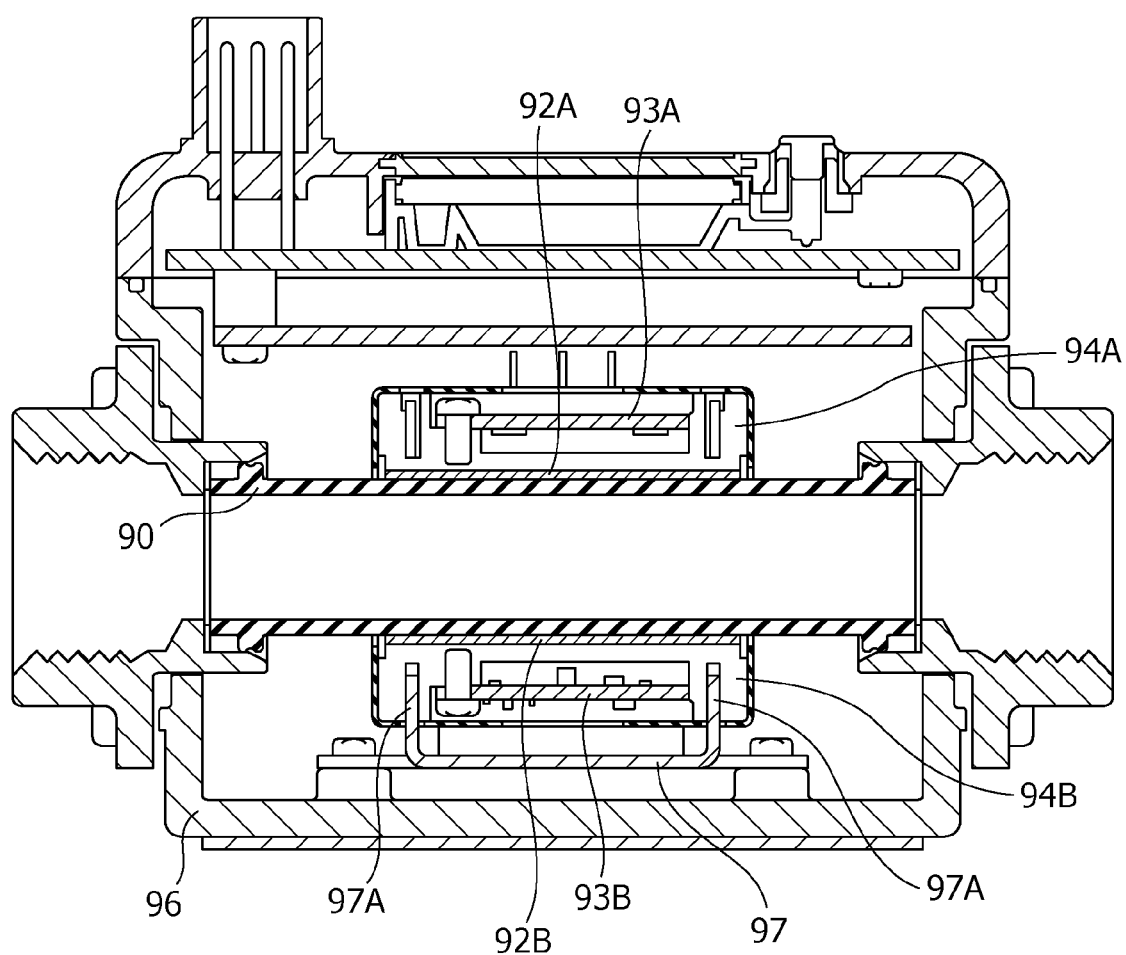
FIG. 21 is a sectional view illustrating a structure of a capacitive electromagnetic flow meter of related art.
Figure 22:
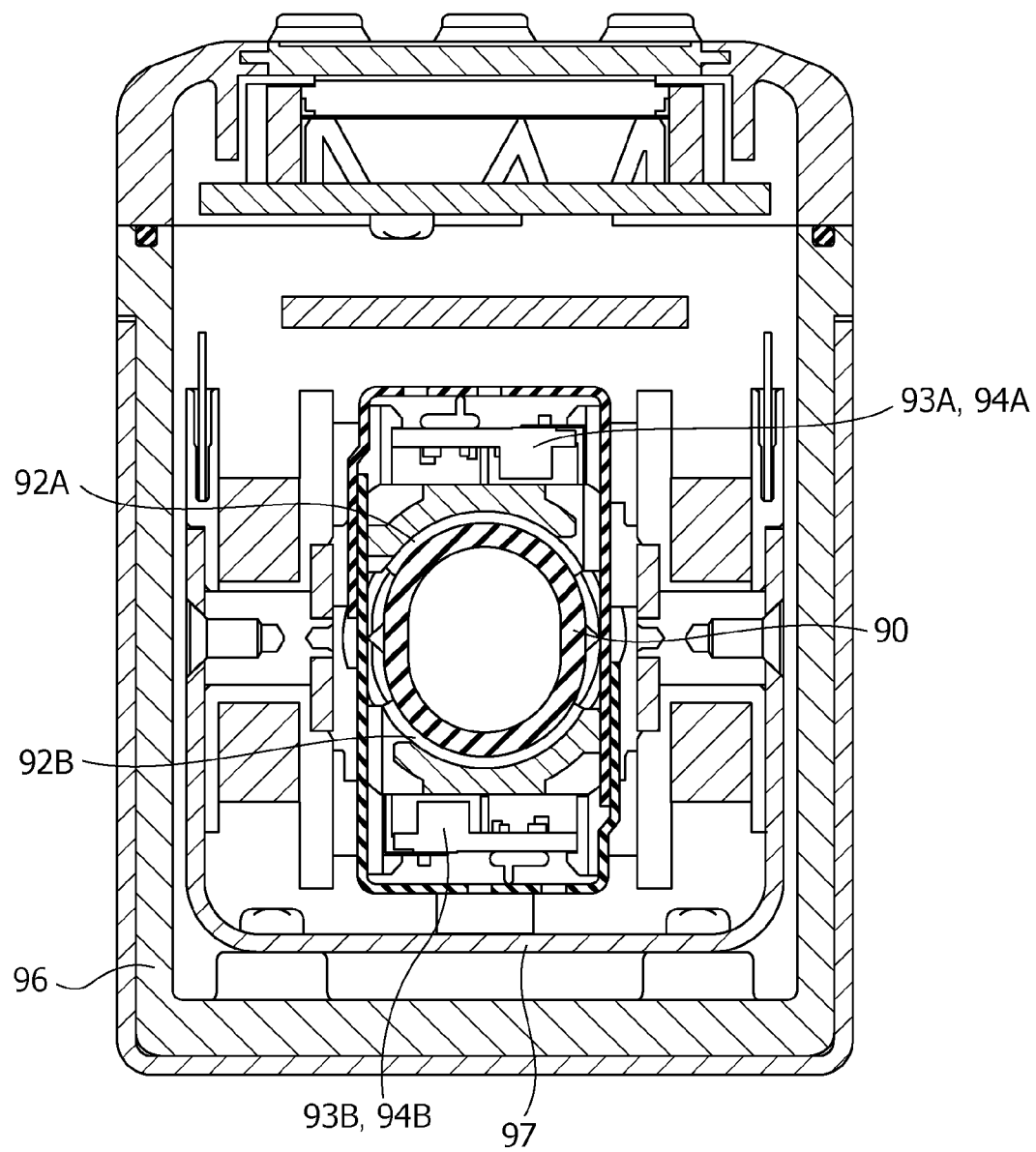
FIG. 22 is another sectional view illustrating the structure of the capacitive electromagnetic flow meter of related art.

For instance, the measuring pipe 2 has been described as having the circular cylindrical shape in the above embodiments, the measuring pipe 2 may partly include a square cylindrical portion formed in a square cylindrical shape. FIGS. 17A, 17B, 17C and 17D illustrate other structure examples of the measuring pipe. FIG. 17A is a plan view of a measuring pipe 2', FIG. 17B is a side view, FIG. 17C is a front view, and FIG. 17D is a sectional view taken along a line XVIID-XVIID in FIG. 17B.

The measuring pipe 2' is made of synthetic resin mixed with ceramic, such as alumina, or ceramic powder each having a high dielectric constant. As illustrated in FIGS. 17A, 17B, 17C and 17D, the measuring pipe 2' includes circular cylindrical portions 2L and 2R disposed at both ends of the measuring pipe 2', formed in a circular cylindrical shape, and connected to a not-illustrated pipe, and a square cylindrical portion 2C disposed between the circular cylindrical portions 2L and 2R and formed in a circular cylindrical shape. In the square cylindrical portion 2C of the measuring pipe 2', as illustrated in FIG. 17D, cross-sections of a pipe wall and a pipe path are both substantially square. The measuring pipe 2' is inserted through a substantially square pipe hole 5H' formed in a printed board 5', and is fixed with the aid of projections 5T'. Surface electrodes 10B' and 10A' are formed on parallel wall surfaces of the square cylindrical portion 2C of the measuring pipe 2' (on upper and lower surfaces of the square cylindrical portion 2C in FIGS. 17B and 17D). The surface electrodes 10B' and 10A' are connected to a not-illustrated circuit, which is formed on the printed board 5', via pipe-side wiring patterns 13B', 14B', 13A' and 14A', and jumper lines 15B' and 15A', respectively.

Since the measuring pipe 2' includes the square cylindrical portion 2C, the two surface electrodes 10A' and 10B' can be disposed parallel to each other, and hence a higher S/N ratio is expectable. In addition, since the measuring pipe 2' is more easily arranged inside the housing together with coils and other parts, further reduction of the device size can be realized.

What is claimed is:

1. An electromagnetic flow meter, comprising:
a measuring pipe through which a fluid as a target to be measured flows;
a bottom-equipped box-shaped case having an opening on an upper side to receive the measuring pipe;
a printed board having a pipe hole to which the measuring pipe is press-fitted; and
a guide formed on or in an inner wall of the case and fitted to a side end portion of the printed board inserted through the opening.

2. The electromagnetic flow meter according to claim 1, wherein the guide is a rib or a groove formed on or in the inner wall.

3. The electromagnetic flow meter according to claim 1, wherein the electromagnetic flow meter includes plural sets of the printed boards and the guides.

4. The electromagnetic flow meter according to claim 1, wherein the printed board includes a board-side wiring pattern for connection to an electrode formed on the measuring pipe.

5. The electromagnetic flow meter according to claim 4, wherein the measuring pipe includes a pipe-side wiring pattern formed on an outer peripheral surface of the measuring pipe, the pipe-side wiring pattern having one end connected to the electrode and the other end extending up to near the printed board.

6. The electromagnetic flow meter according to claim 1, wherein the printed board includes a plurality of projections formed on a wall surface of the pipe hole and contacting with an outer peripheral surface of the measuring pipe.

7. The electromagnetic flow meter according to claim 1, wherein the printed board includes a cutout defining the pipe hole.

8. The electromagnetic flow meter according to claim 1, wherein the measuring pipe is formed in a circular cylindrical shape.

9. The electromagnetic flow meter according to claim 1, wherein the measuring pipe includes a square cylindrical portion formed in a square cylindrical shape.

* * * * *